US006757394B2

(12) United States Patent
Matsuo

(10) Patent No.: US 6,757,394 B2
(45) Date of Patent: Jun. 29, 2004

(54) MICROPHONE ARRAY

(75) Inventor: Naoshi Matsuo, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/421,909

(22) Filed: Apr. 24, 2003

(65) Prior Publication Data

US 2003/0179890 A1 Sep. 25, 2003

Related U.S. Application Data

(62) Division of application No. 09/100,033, filed on Jun. 19, 1998.

(30) Foreign Application Priority Data

Feb. 18, 1998 (JP) .......................................... 10-036247

(51) Int. Cl.[7] ............................ H04R 3/00; H04B 1/02

(52) U.S. Cl. ........................... 381/92; 381/111; 381/91

(58) Field of Search ............................. 381/92, 111, 91

(56) References Cited

U.S. PATENT DOCUMENTS

| | | | | |
|---|---|---|---|---|
| 5,051,964 A | | 9/1991 | Sasaki | 367/135 |
| 5,465,302 A | | 11/1995 | Lazzari et al. | 381/66 |
| 5,715,319 A | | 2/1998 | Chu | 381/26 |
| 5,778,083 A | | 7/1998 | Godfrey | 381/92 |
| 5,787,183 A | | 7/1998 | Chu et al. | 381/92 |
| 6,243,471 B1 | | 6/2001 | Brandstein et al. | 381/92 |
| 6,317,501 B1 | | 11/2001 | Matsuo | 381/92 |
| 6,600,824 B1 | * | 7/2003 | Matsuo | |

* cited by examiner

*Primary Examiner*—Minsun Oh Harvey
*Assistant Examiner*—Laura A. Grier
(74) *Attorney, Agent, or Firm*—Armstrong, Quintos, Kratz, Hanson & Brooks, LLP

(57) ABSTRACT

The present invention provides a microphone array including a small number of real microphone that can realize the same characteristics as a microphone array including a large number of real microphones. The microphone array of the present invention includes a plurality of real microphones, at least one virtual microphone, and an estimator for estimating a sound signal to be received by the virtual microphone based on the sound signals received by the real microphones.

1 Claim, 27 Drawing Sheets

A

B

MICROPHONE ARRAY

This application is a divisional of prior application Ser. No. 09/100,033 filed Jun. 19, 1998.

BACKGROUND OF THE INVENTION

1. Field of the Invention

The present invention relates to a microphone array for detecting the direction and the position of a sound source, enhancing a desired signal and suppressing noise by performing signal processing based on signals inputted from arrayed microphones.

2. Description of the Related Art

A microphone array includes a plurality of real microphones connected in an array and processes signals received by the real microphones so that directivity can be provided.

In a microphone array, an SN(signal-to-noise) ratio can be improved by two approaches, namely, enhancement of a desired signal coming from a look direction and suppression of unnecessary noise. A conventional microphone array according to each approach will be described below.

FIG. 25 is a view showing an example of the structure of a conventional microphone array, which is a so-called delay-and-sum array. The delay-and-sum array shown in FIG. 25 includes a plurality of real microphones 2501, a plurality of delay units 2502 corresponding to the respective real microphones and an adder 2503.

The delay-and-sum array enhances a desired signal coming from a look direction by utilizing a time lag generated when a sound wave coming from the look direction reaches the plurality of real microphones. FIG. 26 is a view illustrating enhancement of a desired signal in the delay-and-sum array. In FIG. 26, a sound wave that can be approximated to a plane wave is received at two microphones 2601 and 2602 in a free space. In FIG. 26, a bold arrow denotes a propagation direction of the sound wave, and a broken line denotes a wavefront. The two real microphones 2601 and 2602 are separated by a distance d.

It is assumed that a sound wave comes from a look direction θ, and that the signal received at the real microphone 2602 is delayed against the signal received at the real microphone 2601 by a time lag τ during which the sound wave travels a distance ξ. This can be expressed by the following equations:

$$x_2(t)=x_1(t-\tau)$$

$$\tau=\xi/c=d\cdot(\sin\theta)/c,$$

where c represents the velocity of sound. When the signal received at the real microphone 2601 is delayed for a delay period τ, the two received signals that were previously separated by a time lag become in-phase on the time axis. On the other hand, sound waves coming from directions other than the look direction are received at the real microphones with time lags different from the time lag τ, so that the signals are not processed to be in-phase by this delay operation. In other words, the above-described delay operation makes it possible to enhance the desired signal coming from the look direction.

The delay-and-sum array shown in FIG. 25 processes an input signal from each real microphone 2501 to be in-phase with the delay unit 2502, and then the signals are added by the adder 2503, so that the desired signal coming from the look direction can be enhanced.

Next, a conventional microphone array according to the approach of noise suppression will be described. FIG. 27 shows an example of the structure of a microphone array that suppresses noise. The microphone array shown in FIG. 27 is called a subtraction type array. The subtraction type array shown in FIG. 27 includes two real microphones 2701 and 2702, a delay unit 2703, a subtracter 2704, and a desired signal correction filter 2705.

In the subtraction type array, when noise coming only from a direction θ are received at the two microphones 2701 and 2702, the relationship expressed by the equation: $x_2(t)=x_1(t-\tau)$ is satisfied. In this case, $x_1(t)$ is delayed by time τ so as to process noise components included in the two received signals to be in-phase as in the case of the delay-and-sum array. Then, the noise that is in-phase is subtracted so that those noise components can be erased.

However, the direction θ of the noise is unknown in many cases. Therefore, the value of τ is unknown. Then, as shown in FIG. 27, information about an output e(t) from the subtracter 2704 is fed back to the delay unit 2703 so that an amount of delay is adjusted to minimize the power of the output e(t).

If the received signals consist only of noise coming from the direction θ, e(t) becomes zero, which is the minimum, when the amount of delay becomes τ. According to this approach, even if a value of θ is unknown, noise can be erased by a subtraction process.

On the other hand, if a desired signal comes from a direction other than the direction θ, the desired signals are not processed to be in-phase by the above-described operation. Therefore, the signals of the desired signal cannot be erased by subtraction. The frequency components of the signals of the desired signal, however, are changed by subtraction. Therefore, as shown in FIG. 27, a desired signal correction filter 2705 is provided to correct this change.

When noise comes from a small number of directions, the subtraction type array can provide an effective improvement in the SN ratio, even if the subtraction type array is small.

However, when using the delay-and-sum array or the subtraction type array, it is necessary to increase the number of real microphones in order to improve the enhancement of a desired signal, the suppression of noise and the performance for detecting the position of the sound source, thus causing the problem of upsizing the array.

SUMMARY OF THE INVENTION

Therefore, with the foregoing in mind, it is an object of the present invention to provide a compact and high-performance microphone array with a small number of real microphones that can provide substantially the same quality as a microphones array with a large number of real microphones.

In order to achieve the object, a microphone array of the present invention comprises a plurality of real microphones arranged in predetermined positions, at least one virtual microphone, and a sound signal estimator for estimating a sound signal received by the virtual microphone. The sound signal estimator comprises a sound signal divider for dividing, based on sound signals received by the plurality of real microphones, a sound signal received by a predetermined real microphone into components, each component corresponding to one coordinate axis direction in a coordinate system that is defined on the basis of positions of the plurality of real microphones, a sound signal component estimator for estimating a virtual microphone sound signal component corresponding to a predetermined coordinate axis direction in the coordinate system, based on the sound signal received by the predetermined real microphone and the sound signal component corresponding to the predetermined coordinate axis direction divided by the sound signal divider; and a sound signal component adder for adding the sound signal component corresponding to the coordinate axis direction divided by the sound signal divider and the sound signal component, each component corresponding to one coordinate axis direction estimated by the sound signal component estimator.

In one embodiment of the present invention, the microphone array further comprises at least one delay element for performing delay processing to each sound signal so that sound signals received by the plurality of real microphones and sound signals estimated by the sound signal estimator are in-phase; and an adder for adding signals that have been processed by the delay elements. This embodiment makes it possible to enhance a desired signal by using the estimated sound signal. Furthermore, by subtracting the signal that has been processed in the delay element, it is possible to suppress noises by using the estimated signal.

In another embodiment of the present invention, the microphone array further comprises a correlation coefficient calculator for calculating correlation coefficients based on sound signals received by the predetermined real microphone and a sound signal estimated by the sound signal estimator; and a sound source position estimator for estimating a position of a sound source based on the correlation coefficients calculated by the correlation coefficient calculator. Correlation coefficients indicate the correlation between two signals. For example, it is generally known that, by calculating the correlation coefficients between sound signals received by arbitrary two real microphones based on a predetermined equation so as to perform a predetermined process with the calculated results, the position of a source of a desired signal can be estimated. Therefore, the calculation of correlation coefficients of the estimated sound signals makes it possible to estimate the position of the sound source more precisely.

A second microphone array of the present invention including a plurality of real microphones connected in an array comprises a sound signal divider for dividing, based on sound signals received by the plurality of real microphones, a sound signal received by a predetermined real microphone into components, each corresponding to one coordinate axis direction in a coordinate system defined on the basis of the positions of the plurality of real microphones. This embodiment makes it possible to separate voices of two speakers when speaker A exists on one coordinate axis and another speaker B exists in a direction perpendicular to the coordinate axis.

In one embodiment of the second microphone array of the present invention, the microphone array further comprises a sound power calculator for calculating a sound power of a component corresponding to a coordinate axis direction based on the sound signal component corresponding to a coordinate axis direction divided by the sound signal divider; and a sound source direction estimator for estimating a direction of a sound source based on the sound power calculated by the sound power calculator. This embodiment is advantageous, because an angle to a predetermined coordinate axis when the sound source is viewed from the position of the predetermined real microphone can be estimated, based on the ratio of sound powers of sound signal components, each component corresponding to each of the coordinate axis directions.

A third microphone array of the present invention including a plurality of real microphones and at least one virtual microphone comprises a sound signal divider for dividing, based on sound signals received by the plurality of real microphones, a sound signal received by a predetermined real microphone into components, each corresponding to one coordinate axis direction in a coordinate system defined on the basis of positions of the plurality of real microphones; a sound signal component estimator for estimating a virtual microphone sound signal component corresponding to a coordinate axis direction in the coordinate system; a sound power calculator for calculating sound powers of components, each corresponding to a coordinate axis direction of a sound signal received by the real microphone and a virtual microphone sound signal, based on the sound signal component divided by the sound signal divider and the sound signal component estimated by the sound signal component estimator; and a sound source position estimator for estimating a position of a sound source based on the sound powers calculated by the sound power calculator.

The calculation of sound powers of estimated sound signals makes it possible to estimate angles to a predetermined coordinate axis when the sound source is viewed from a plurality of positions. Therefore, the position of the sound source can be estimated in a more limited range.

A fourth microphone array of the present invention including a plurality of real microphones comprises a rotator for rotating the microphone array; a rotation controller for controlling a rotation angle of the rotator; a correlation coefficient calculator for obtaining the rotation angle of the rotator and calculating correlation coefficients for each angle based on sound signals received by the plurality of real microphones; and a sound source position estimator for comparing the correlation coefficients calculated by the correlation coefficient calculator for each angle and estimating a position of a sound source based on results of the comparison.

By rotating the microphone array and calculating correlation coefficients for every angle of rotation, it is possible to determine the direction of the source of the desired signal precisely. Therefore, it is possible to enhance the desired signal or suppress noise more precisely, based on sound signals received by the microphone array including a plurality of microphones. Furthermore, it is possible to estimate the direction of the sound source by calculating the ratio of powers instead of the correlation coefficients.

In one embodiment of the fourth microphone array of the present invention, the microphone array further comprises a position detector for detecting a position of the microphone array. The sound source position estimator compares correlation coefficients calculated by the correlation coefficient calculator for every position detected by the sound source position detector and every rotation angle so as to estimate a position of a sound source based on results of the comparison.

A fifth microphone array of the present invention including a plurality of real microphones comprises at least one delay element for performing delay processing to a sound signal received by each of the plurality of real microphone so that sound signals received by the plurality of real microphones are in-phase; an adder for adding signals that have been processed by the delay elements; an image capturer for capturing an image of a sound source; a sound source position detector for detecting a position of the sound source based on an output from the image capturer; and a delay controller for controlling delay processing by the delay element based on the position of the sound source detected by the sound source position detector.

This embodiment including an image capturer for finding the sound source is especially effective in an environment with a high noise level, because the desired signal enhancement process is performed while detecting the position of the sound source. As in the desired signal enhancement process, a noise suppression process is performed while detecting the position of a specific noise source such as a speaker, so that this embodiment is effective to suppress a specific noise, i.e., echo or howling.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of embodiments with reference to the accompanying drawings.

Figure 1:
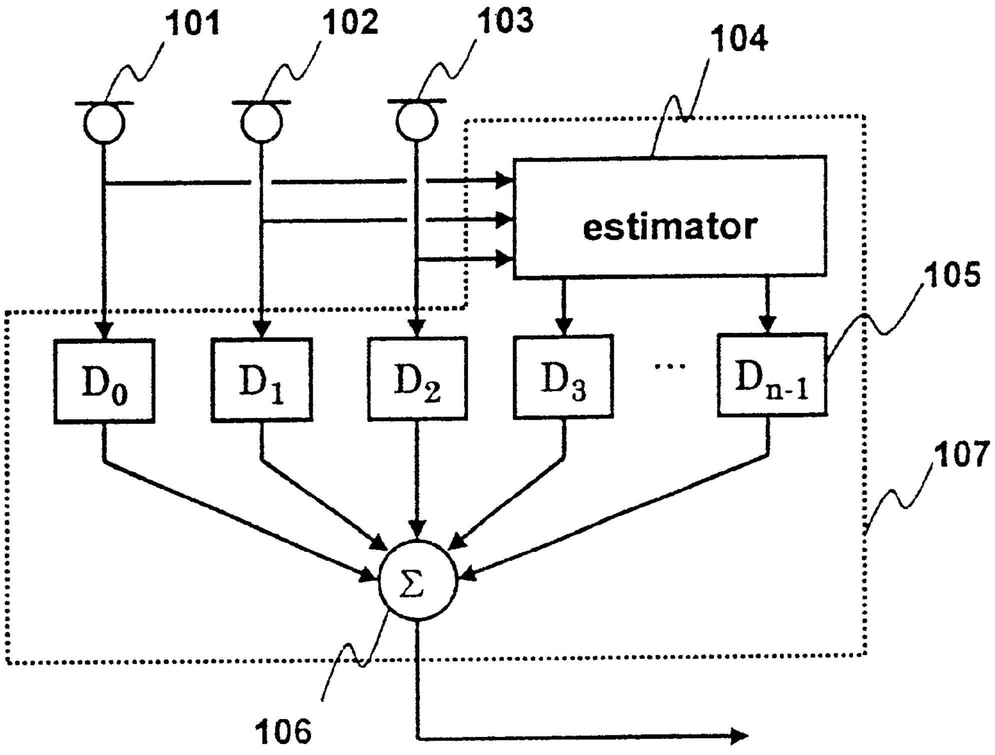
FIG. 1 is a block diagram showing a basic structure of a microphone array of the present invention.

FIG. 1 is a block diagram showing the basic structure of a microphone array of the present invention. As shown in FIG. 1, the microphone array of the present invention includes real microphones 101, 102 and 103, an estimator 104, a plurality of delay units 105, and an adder 106. In this embodiment, the functions of the estimator 104, the plurality of delay units 105, and the adder 106 are realized in software by using a digital signal processor (DSP) 107.

Either non-directional or directional microphone can be used for the real microphones 101, 102 and 103 (hereinafter referred to as "MIC 0", "MIC 1" and "MIC 2", respectively).

Herein, it is simulated that real microphones other than the three real microphones 101, 102 and 103 are provided. The estimator 104 estimates virtual signals received by virtual microphones that do not actually exist but are assumed to exist (hereinafter, referred to as "virtual microphones") based on inputs from the three real microphones. Then, the estimator 104 outputs each signal to a corresponding delay unit of the plurality of delay units 105. In this embodiment, the estimated signals are output to (n−3) delay units from $D_3$ to $D_{n-1}$.

The number of delay units 105 corresponds to the number of microphones, i.e., MIC 0, MIC 1, MIC 2 and the virtual microphones whose input signals are estimated by the estimator 104. In the example shown in FIG. 1, n delay units are provided for estimating received signals of (n−3) virtual microphones, in addition to the three existing real microphones.

The adder 106 adds the output from the n delay units 105 and outputs a signal as a result. The output signal from the adder 106 is an in-phase signal of a desired signal as a result of the delay operation of the plurality of delay units 105. In other words, a signal of an enhanced desired signal can be obtained in the same manner as the delay-and-sum array described as a conventional technique. In this embodiment, a microphone array according to the approach of enhancement of a desired signal will be described, but the present invention can easily be applied to a subtraction type array with estimated signals.

In this embodiment, a signal processor such as TMS320C40 (manufactured by Texas Instrument), which has a 32 bit floating-point arithmetic accuracy, is used for the DSP 107, but other processors that have an equivalent function can be used. Furthermore, a DSP that has a fixed-point arithmetic accuracy also can be used.

Next, a method for estimating sound signals in the microphone array of the present invention will be described.

Sound signals can be estimated based on wave equations expressed by Equations 1 and 2 below. It is generally known that the propagation of sound wave can be expressed by the wave equations, Equations 1 and 2 below. These equations make it possible to estimate the behavior of particles in the air in an arbitrary position other than the position of a sound source. The behavior of particles is defined by the sound wave occurring from the sound source.

$$-\nabla v = 1/K \cdot \partial p/\partial t \quad \text{(Equation 1)}$$

$$-\nabla p = \rho \cdot \partial v/\partial t \quad \text{(Equation 2)}$$

In the above partial differential equations, t represents time, p represents the sound pressure, v represents the velocity of air particles, which are the medium for propagation of the sound wave, K represents the volume elasticity (ratio of pressure to dilatation), and ρ represents the density (mass per unit volume) of the air medium. The sound pressure p is a scalar, and the particle velocity v is a vector. The partial differential operators in the right side of Equations 1 and 2 indicate partial differentiation over time t. In the case of rectangular coordinates (x, y, z), the partial differential operators on the left side of Equations 1 and 2, which are Hamiltonian operators, have the form of $$\nabla = (\partial/\partial x)xI + (\partial/\partial y)yI + (\partial/\partial z)zI, \quad \text{(Equation 3)}$$

where xI, yI and zI represent unit vectors in the directions of the x-axis, the y-axis and the z-axis, respectively.

In this embodiment, the case where a source of a desired signal is at least a predetermined distance apart from real microphones and the sound wave reaching the real microphones is approximate to a plane wave rather than a spherical wave will be described to simplify the explanation. The same is true for the following embodiments. In this case and the case where a microphone array includes a plurality of real microphones aligned in a straight line, a desired signal can be estimated with the one-dimensional wave equations expressed by $$-\partial v/\partial x = 1/K \cdot \partial p/\partial t, \text{ and} \quad \text{(Equation 4)}$$

$$-\partial p/\partial x = \rho \cdot \partial v/\partial t. \quad \text{(Equation 5)}$$

When the source of the desired signal is within a predetermined distance from the real microphone, it is necessary to regard the sound wave reaching the real microphones as a spherical wave rather than a plane wave. This case can be dealt with by raising the dimension of the wave equations.

Since sound signals in the microphone array in this embodiment are digitized by a LPF (low pass filter) and an A/D (analog to digital) converter (not shown) for processing, the above-described wave equations cannot be applied as they are. Therefore, the estimation at the estimator 104 is performed by calculating with difference equations expressed by Equations 6 and 7, which are derived from Equations 4 and 5. In Equations 6 and 7, a and b, which represent constant coefficients, are both 1.0 in this embodiment. The value of a and b may be changed when the real microphones are spaced away at an interval different from a predetermined estimated position interval. In addition, $t_j$ is a sampling time. More specifically, in the case of 8 KHz sampling, the sampling period is 1/8000 sec, and j represents the order corresponding to the segment of the sampling time among the 8000 segments constituting one second. Furthermore, $x_i$ represents an estimated position on the x-axis.

$$v(x_{i+1}, t_{j+1}) - v(x_i, t_{j+1}) = a\{p(x_{i+1}, t_{j+1}) - p(x_{i+1}, t_j)\} \quad \text{(Equation 6)}$$

$$p(x_{i+1}, t_j) - p(x_i, t_j) = b\{v(x_i, t_{j+1}) - v(x_i, t_j)\} \quad \text{(Equation 7)}$$

A sound pressure p in an arbitrary position $x_i$ can be estimated with Equations 6 and 7. The estimation of signals with Equations 6 and 7 can be performed in both directions in which the value of $x_i$ increases and decreases from the position of the MIC 0.

The interval between the real microphones will be described below. In the microphone array in this embodiment, preferable values of the intervals between MIC 0 and MIC 1 and between MIC 1 and MIC 2 are obtained by dividing the velocity of sound in air (340 m/s) by a sampling frequency. More specifically, in the case of 8 KHz sampling, the interval between the real microphones is preferably about 4.25 cm. In the case of 16 KHz sampling, the interval between the real microphones is preferably a half of the interval between the real microphones in the case of 8 KHz sampling. An excessively wide interval between microphones causes the problem that Equations 6 and 7 are not applicable. In other words, an excessively wide interval reduces the correlation between sound pressures detected by two real microphones, so that the velocity of medium particles cannot be estimated based on a difference between detected sound pressures.

The sound pressure p estimated by the estimator 104 is input to a delay unit corresponding to an estimated position $x_i$ among the plurality of delay units 105. Then, signals that are processed to be in-phase by the delay units 105 are added by the adder 106, so that an enhanced desired signal can be obtained. In this embodiment, the structure for the enhancement of the desired signal has been illustrated, but the configuration for suppression of noise is also possible by using estimated signals.

As described above, the use of the microphone array of the present invention provides the same level of accuracy as a microphone array including a large number of microphones, even if the microphone array includes a small number of real microphones.

Hereinafter, various embodiments of the microphone array having the basic structure as described above will be described with reference to the accompanying drawings.

Embodiment 1

First, a first embodiment will be described below.

In this embodiment, a sound wave is divided into a wave that is transmitted in a direction along the x-axis (hereinafter referred to as "x-axis direction component") and a wave that is transmitted in a direction along the y-axis (hereinafter referred to as "y-axis direction component"). In this embodiment, a method for estimating sound pressures of respective sound waves in the x-axis direction component and y-axis direction component (hereinafter referred to as "sound pressure in the x-axis direction" and "sound pressure in the y-axis direction", respectively) will be described. Here, "dividing the sound wave into the x-axis direction component and y-axis direction component" means that the orientation of the sound wave is taken into consideration, that is the x-axis direction or the y-axis direction. In other words, although the sound pressure is a scalar which does not have a direction, the scalar p is divided into a sound pressure px of the x-axis direction component and a sound pressure py of the y-axis direction component in this embodiment. The direction in which the real microphones are aligned is the x-axis direction.

Figure 2:
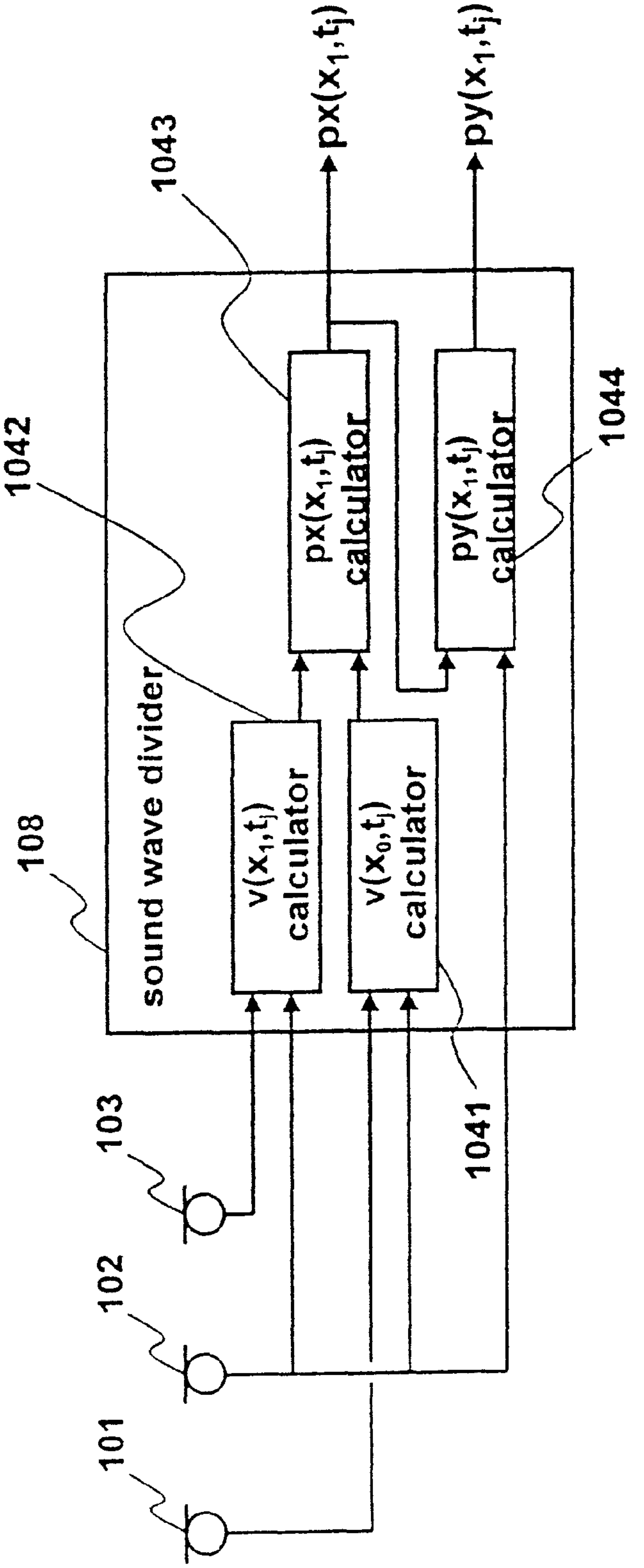
FIG. 2 is a block diagram showing the structure of a microphone array according to a first embodiment of the present invention.

FIG. 2 is a block diagram showing the structure of a microphone array in this embodiment. As shown in FIG. 2, the microphone array in this embodiment includes a sound wave divider 108, in addition to three real microphones which are provided in the same manner as in the microphone array having the basic structure described above.

The sound wave divider 108 in this embodiment includes a $v(x_0, t_j)$ calculator 1041, a $v(x_1, t_j)$ calculator 1042, a $px(x_1, t_j)$ calculator 1043 and a py $(x_1, t_j)$ calculator 1044. Herein, $t_j$ represents a sampling time.

In this embodiment, as in the microphone array having the basic structure described above, the case where the sound wave reaching the real microphones from the source of a desired signal can be approximated by a plane wave will be described. In other words, when the sound pressure that has reached the real microphones is divided into a sound pressure px of the x-axis direction component and a sound pressure py of the y-axis direction component, the sound pressure py of the y-axis direction component is constant and not dependent on the positions of the real microphones.

Therefore, it is possible to estimate the particle velocity of a medium defined by sound waves received by the real microphones based on the difference between the sound pressures by using $$v(x_0, t_j)=v(x_0, t_{j-1})+(1/b)\cdot\{p(x_1, t_{j-1})-p(x_0, t_{j-1})\}, \quad \text{(Equation 8)}$$

$$v(x_1, t_j)=v(x_1, t_{j-1})+(1/b)\cdot\{p(x_2, t_{j-1})-p(x_1, t_{j-1})\}, \quad \text{(Equation 9)}$$

$$px(x_1, t_j)=px(x_1, t_{j-1})+(1/a)\cdot\{v(x_1, t_j)-v(x_0, t_j)\}, \text{ and} \quad \text{(Equation 10)}$$

$$py(x_1, t_j)=p(x_1, t_j)-px(x_1, t_j). \quad \text{(Equation 11)}$$

Equation 8 represents a process performed by the $v(x_0, t_j)$ calculator 1041. Equation 8 is used to estimate a particle velocity $v(x_0, t_j)$ at a position $x_0$ at a time $t_j$, based on an estimated particle velocity $v(x_0, t_{j-1})$ at the position $x_0$ at a time $t_{j-1}$ and a difference between the sound pressures p measured at the real microphones MIC 0 and MIC 1.

Equation 9 represents a process performed by the $v(x_1, t_j)$ calculator 1042. Equation 9 is used to estimate a particle velocity $v(x_1, t_j)$ at a position $x_1$ at a time $t_j$, based on an estimated particle velocity $v(x_1, t_{j-1})$ at the position $x_1$ at a time $t_{j-1}$ and a difference between the sound pressures p measured at the real microphones MIC 1 and MIC 2.

Equation 10 represents a process performed by the $px(x_1, t_j)$ calculator 1043. Equation 10 is used to calculate a sound pressure $px(x_1, t_j)$ in the x-axis direction at a position $x_1$ at a time $t_j$, based on a calculated sound pressure $px(x_1, t_{j-1})$ at the position $x_1$ of MIC 1 at a time $t_{j-1}$ and a difference between the particle velocities estimated at the positions $x_0$ and $x_1$ at the time $t_j$.

Equation 11 represents a process performed by the $py(x_1, t_j)$ calculator 1044. As described above, the scalar p is divided into the sound pressures px and py, so that the sum of the sound pressures px and py is equal to the original sound pressure p. Therefore, it is possible to calculate the sound pressure py of the y-axis direction component at the position $x_1$ at the time $t_j$, based on the sound pressure px of the x-axis direction component calculated by the $px(x_1, t_j)$ calculator 1043.

The above-described structure and process make it possible to divide the sound wave from the sound source into the x-axis direction component and the y-axis direction component. In other words, as shown in FIG. 2, it is possible to obtain $px(x_1, t_j)$ and $py(x_1, t_j)$ as output from the microphone array of this embodiment. In the description of this embodiment, the processing of the output by the delay units is omitted, but it is advantageous to obtain $px(x_1, t_j)$ and $py(x_1, t_j)$ as output in this embodiment, because, for example, in the case where speaker A is positioned on the extended line of the x-axis and speaker B is positioned in a direction perpendicular to the x-axis, it is possible to differentiate the voice of speaker A and the voice of speaker B so as to record each voice separately or transmit each voice separately to a person to communicate with.

Embodiment 2

Next, a second embodiment of the present invention will be described below. In this embodiment, a method for estimating a sound pressure p of a sound signal received at a virtual microphone that is assumed to be present along the x-axis will be described more specifically.

Figure 3:
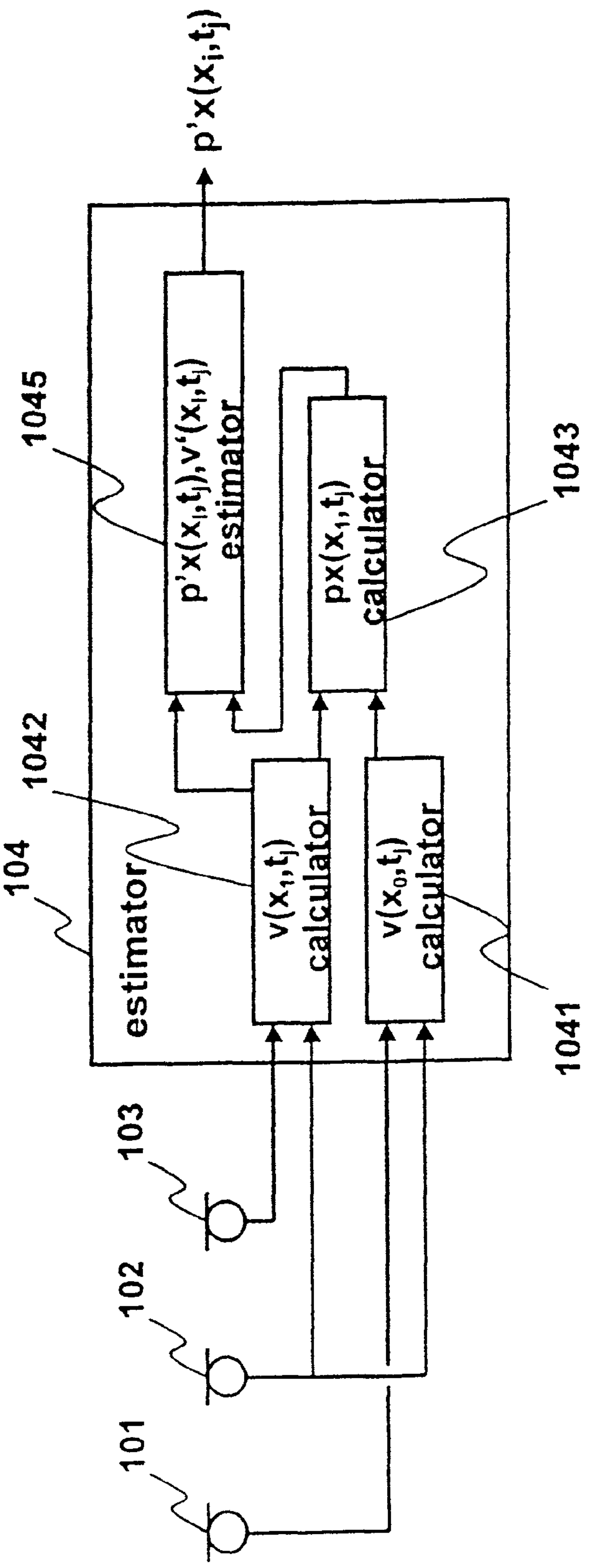
FIG. 3 is a block diagram showing the structure of a microphone array according to a second embodiment of the present invention.

FIG. 3 is a block diagram showing the structure of a microphone array of a second embodiment of the present invention. As shown in FIG. 3, the estimator 104 of the microphone array in this embodiment includes a $v(x_0, t_j)$ calculator 1041, a $v(x_1, t_j)$ calculator 1042, a $px(x_1, t_j)$ calculator 1043 and a $p'x(x_i, t_j)$, $v'(x_i, t_j)$ estimator 1045.

The $v(x_0, t_j)$ calculator 1041, the $v(x_1, t_j)$ calculator 1042 and the $px(x_1, t_j)$ calculator 1043 perform the same process as described in Embodiment 1.

The $p'x(x_i, t_j)$, $v'(x_i, t_j)$ estimator 1045 estimates a sound pressure $p'x(x_i, t_j)$ and a particle velocity $v'(x_i, t_j)$ in the x-axis direction at an arbitrary position $x_i$ on the x-axis with Equations 12 and 13, based on the sound pressures and the particle velocities calculated by the above-described calculators. Herein, letters with an apostrophe, such as p'x and v', represent an estimated value.

$$p'x(x_i, t_{j-(i-2)})=p'x(x_{i-1}, t_{j-(i-2)})+ b\cdot\{v'(x_{i-1}, t_{j-(i-3)})-v'(x_{i-1}, t_{j-(i-2)})\} \quad \text{(Equation 12)}$$

$$v'(x_i, t_{j-(i-2)})=v'(x_{i-1}, t_{j-(i-2)})+ a\cdot\{p'x(x_i, t_{j-(i-2)})-p'x(x_i, t_{j-(i-1)})\} \quad \text{(Equation 13)}$$

In Equations 12 and 13, calculation is repeated with i=2, 3, . . . , n−1, so that the sound pressure p of a sound signal that the virtual microphones should receive can be estimated.

Figure 4:
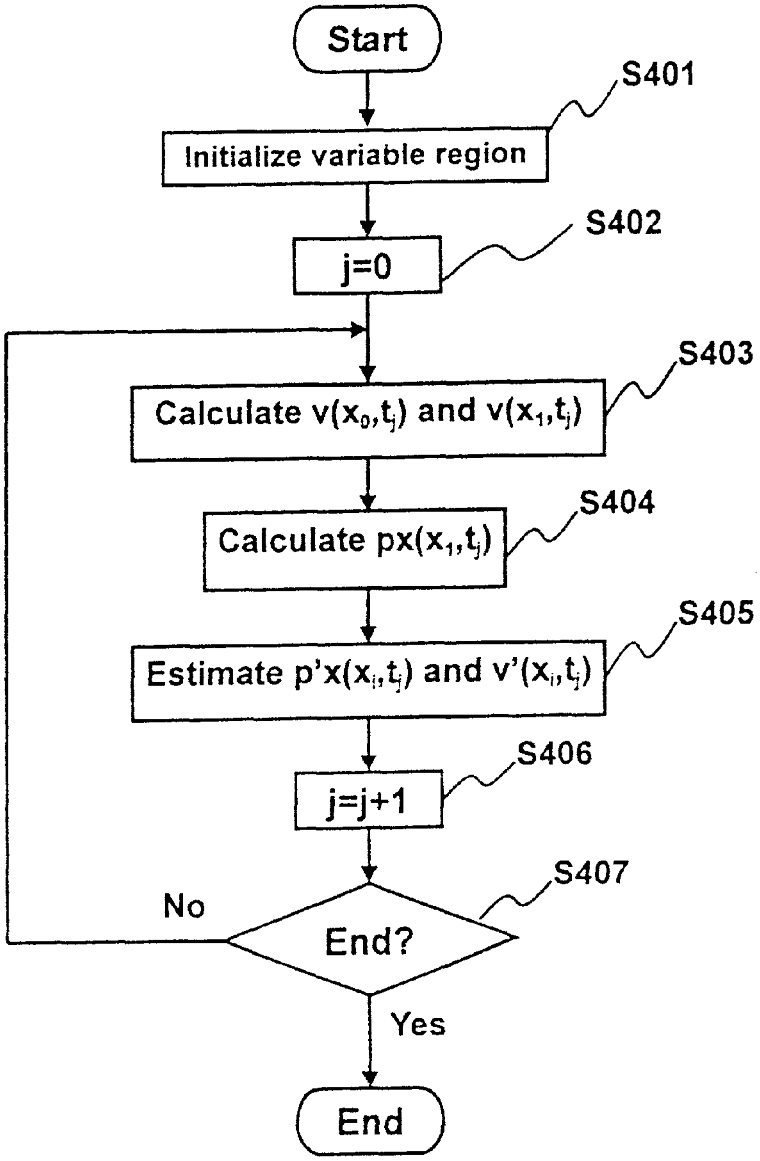
FIG. 4 is a flow chart showing the procedures of an estimator in the second embodiment of the present invention.

FIG. 4 is a flow chart showing the procedures of the estimator 104 in this embodiment. As shown in FIG. 4, the estimator 104 in this embodiment initializes a variable storage region where data of the sound pressure, the particle velocity and the like are stored (S401). A method for storing the sound pressure and the particle velocity will be described later. Next, j, which represents a sampling time, is initialized as zero (S402), and $v(x_0, t_j)$ and $v(x_1, t_j)$ are calculated (S403). Since j is zero in the first calculation, an initial value of the particle velocity is stored without using Equations 8 and 9 described in Embodiment 1. In this embodiment, the initial values of the particle velocity in the positions $x_0$ and $x_1$ are zero. At step S406, a value of 1 is added to j. After step S406, the particle velocity is sequentially calculated with Equations 8 and 9 above, based on the sound pressure measured at the real microphones.

As described above, in this embodiment, the functions of the estimator 104, the delay units 105 and the adder 106 are realized in software by using the DSP 107. The calculated particle velocity $v(x_0, t_j)$ and $v(x_1, t_j)$ are stored in a variable storage region for V (particle velocity $v(x, t)$) provided in an internal or external memory (hereinafter simply referred to as a memory) of the DSP with $x_i$ and $t_j$ as pointers.

Next, the estimator 104 calculates the sound pressure $px(x_1, t_j)$ in the x-axis direction (S404) with Equation 10. The calculated sound pressure in the x-axis direction is stored in a variable storage region for P (sound pressure $px(x, t)$) provided in the memory with $x_i$ and $t_j$ as pointers.

Next, the estimator 104 sequentially estimates $p'x(x_i, t_j)$ and $v'(x_i, t_j)$, using Equations 12 and 13, with respect to a value of i corresponding to the position of each virtual microphone, based on the sound pressure, the particle velocity, etc., stored in the variable storage region (S405). The estimated values are sequentially stored in the variable storage region and used in a subsequent process.

When the estimation processing as described above is completed, a value of 1 is added to j representing a sampling time (S406). When the array continues to be used (S407: No), the procedure goes back to step S403 so as to continue the calculation and estimation of the particle velocity and the sound pressure. The determination at step S407 is necessary for example when a voice with a specific length is input into a voice response system. However, the determination at step S407 may be unnecessary when there is no doubt that the array is used constantly, for example, when the array is used in a public-address system, such as a hands-free telephone.

The above-described process makes it possible to estimate the sound pressure px in the x-axis direction of a sound signal to be received at the virtual microphones. Although this output signal can be used as it is for enhancing the desired signal only in the case where the sound source of the desired signal is on the x-axis, the output signals are input to the delay units 105 and then added so as to enhance the desired signal.

Embodiment 3

Next, a third embodiment of the present invention will be described below. In the microphone array of this embodiment, in addition to the estimation of $p'x(x_i, t_j)$ as described in Embodiment 2, an estimated value $p'(x_i, t_j)$ (i=3, . . . , n−1) of a received signal is obtained by adding $py(x_i, t_j)$, which is constant at different coordinates in the x-axis direction, to the estimated p'x. Since the sound pressure can be detected by the real microphones in the case of i=2, the detected sound pressure can be used instead of estimated sound pressure.

Figure 5:
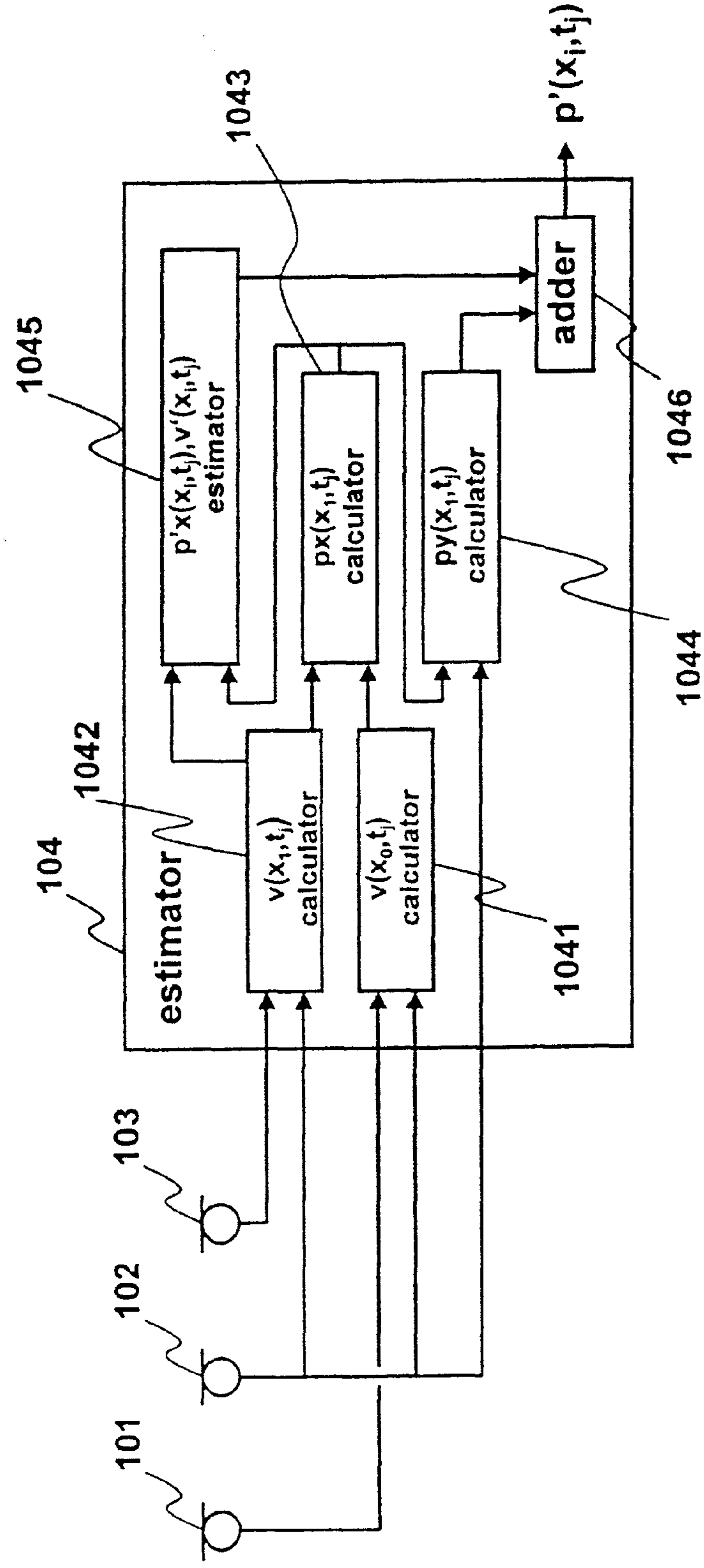
FIG. 5 is a block diagram showing the structure of a microphone array according to a third embodiment of the present invention.

FIG. 5 is a block diagram showing the structure of a microphone array of this embodiment. As shown in FIG. 5, the estimator 104 of the microphone array in this embodiment includes a $v(x_0, t_j)$ calculator 1041, a $v(x_1, t_j)$ calculator 1042, a $px(x_1, t_j)$ calculator 1043, a $py(x_1, t_j)$ calculator 1044, a $p'x(x_i, t_j)$, $v'(x_i, t_j)$ estimator 1045 and an adder 1046.

The $v(x_0, t_j)$ calculator 1041, the $v(x_1, t_j)$ calculator 1042 and the $px(x_1, t_j)$ calculator 1043 and the $py(x_1, t_j)$ calculator 1044 perform the same process as described in Embodiment 1.

Furthermore, the $p'x(x_i, t_j)$, $v'(x_i, t_j)$ estimator 1045 performs the same process as described in Embodiment 2.

In this embodiment, a value of $p'x(x_i, t_j)$ estimated by the $p'x(x_i, t_j)$, $v'(x_i, t_j)$ estimator 1045 and a value of $py(x_1, t_j)$ estimated by the $py(x_1, t_j)$ calculator 1044 are added by the adder 1046, so that a value $p'(x_i, t_j)$ of a sound pressure in an arbitrary position $x_i$ on the x-axis can be estimated. This estimated signal can be input to the delay-and-sum array or the subtraction type array so as to enhance the desired signal or suppress noise.

As described above, the microphone array including a small number of microphones in this embodiment can provide the same level of accuracy as a microphone including a large number of microphones.

Embodiment 4

Next, a fourth embodiment of the present invention will be described below. In the microphone array of this embodiment, in the case where sound sources $s_1$ and $s_2$ are present on the extended line of the x-axis where three real microphones are aligned, a sound pressure $p'(x_i, t_j)$ (i=2, 3, . . . , n−1) on the extended line is obtained.

Figure 6:
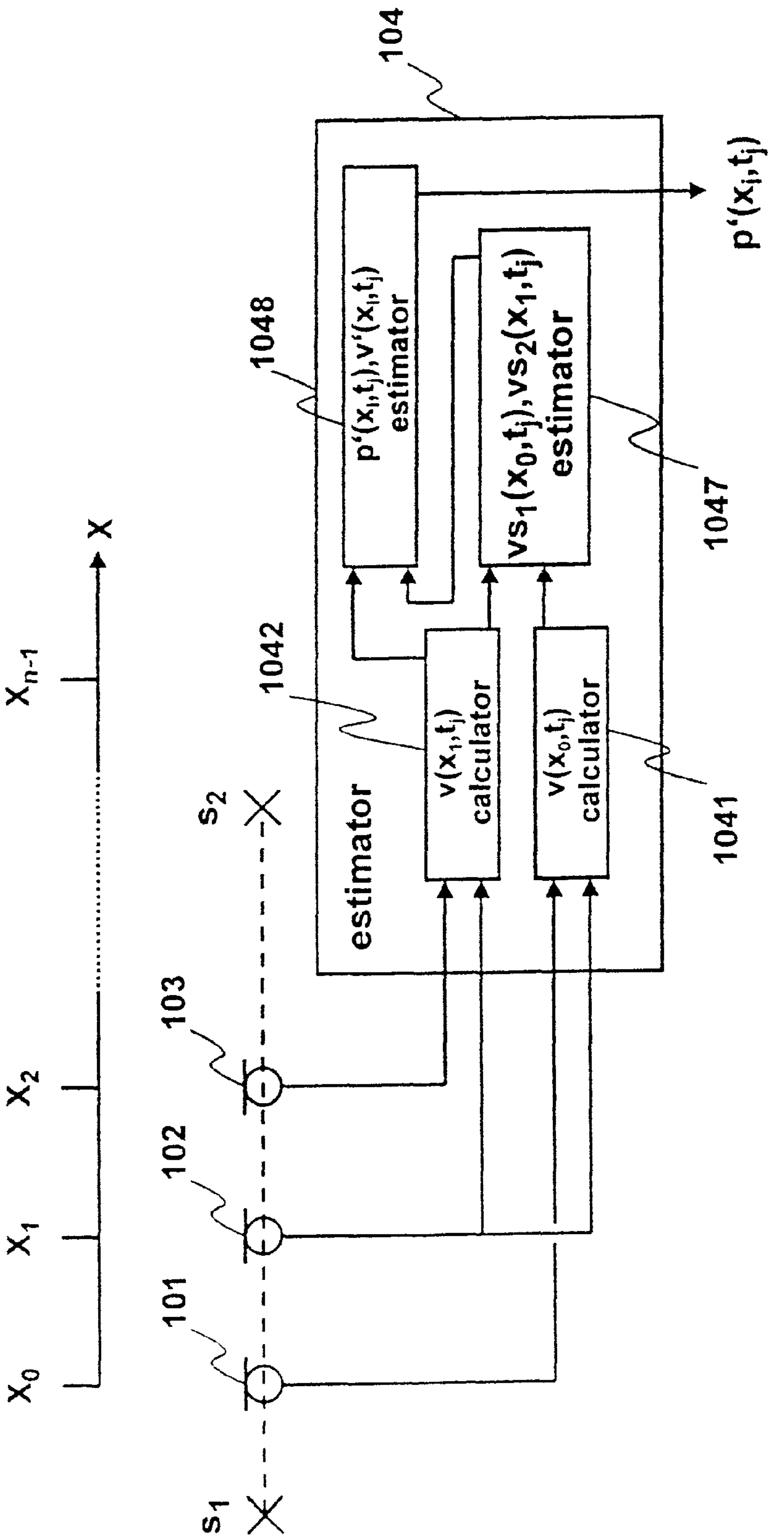
FIG. 6 is a block diagram showing the structure of a microphone array according to a fourth embodiment of the present invention.

FIG. 6 is a block diagram showing the structure of a microphone array of this embodiment. As shown in FIG. 6, the estimator 104 of the microphone array of this embodiment includes a $v(x_0, t_j)$ calculator 1041, a $v(x_1, t_j)$ calculator 1042, a $vs_1(x_0, t_j)$, $vs_2(x_1, t_j)$ estimator 1047 and a $p'(x_i, t_j)$, $v'(x_i, t_j)$ estimator 1048.

The $v(x_0, t_j)$ calculator 1041 and the $v(x_1, t_j)$ calculator 1042 are not further described here, because the calculators 1041 and 1042 perform the same process as described in Embodiment 1.

The $vs_1(x_0, t_j)$, $vs_2(x_1, t_j)$ estimator 1047 estimates the particle velocities $vs_1(x_0, t_j)$ and $vs_2(x_1, t_j)$, which are defined by signals from the sound sources $s_1$ and $s_2$, respectively. The estimation is performed by utilizing the relationship between the particle velocities $vs_1(x_0, t_j)$ and $vs_2(x_1, t_j)$ expressed by $$vs_1(x_i, t_j)=vs_1(x_{i-1}, t_{j-1}), \text{ and} \quad \text{(Equation 14)}$$

$$vs_2(x_i, t_j)=vs_2(x_{i-1}, t_{j+1}). \quad \text{(Equation 15)}$$

In other words, the particle velocity at a position $x_i$ at a sampling time $t_j$ defined by a sound wave from the sound source $s_1$ is equal to the particle velocity at a position $x_{i-1}$, which is one position closer to the sound source $s_1$ on the x-axis, at a sampling time $t_{j-1}$, which is one sampling time earlier. In the relationship viewed from the right side to the left side of Equation 15, the particle velocity at a position $x_i$ at a sampling time $t_j$ defined by a sound wave from the sound source $s_2$ is equal to the particle velocity at a position $x_{i+1}$, which is one position closer to the sound source $s_2$ on the x-axis, at a sampling time $t_{j-1}$, which is one sampling time earlier. A method for estimating the particle velocity and the sound pressure based on these relationships will be described in detail below.

Figure 7:
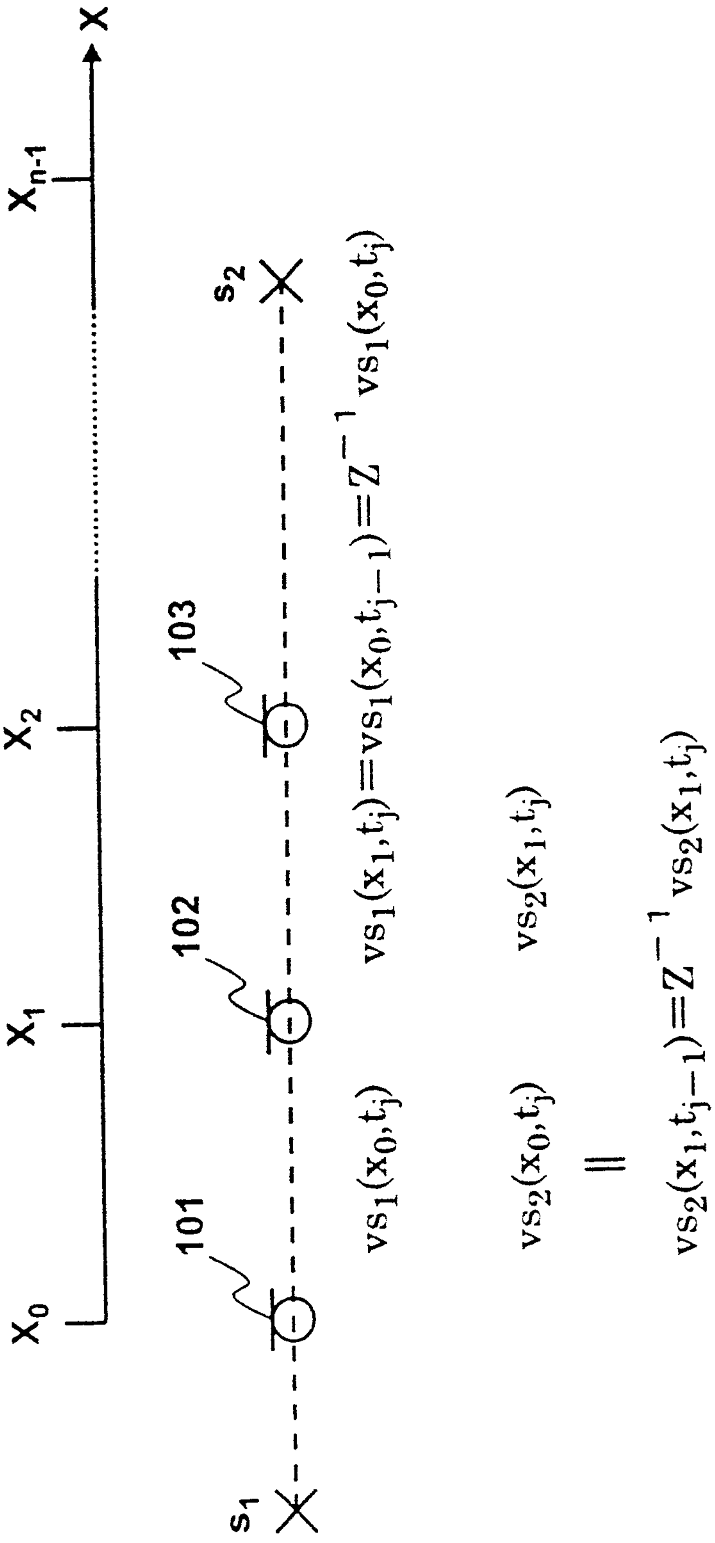
FIG. 7 is a diagram illustrating estimation of $vs_1(x_0, t_j)$ and $vs_2(x_1, t_j)$ in the fourth embodiment of the present invention.

FIG. 7 is a diagram illustrating the estimation of $vs_1(x_0, t_j)$ and $vs_2(x_1, t_j)$. In FIG. 7, $Z^{-1}$ (inverse z-transform) represents a delay of one sampling time, and the particle velocity $v(x_0, t_j)$ at the position $x_0$ at the time $t_j$ and the particle velocity $v(x_1, t_j)$ at the position $x_1$ at the time $t_j$ can be expressed as Equation 16 with $vs_1(x_0, t_j)$ and $vs_2(x_1, t_j)$.

$$v(x_0, t_j)=vs_1(x_0, t_j)+Z^{-1}vs_2(x_1, t_j) \quad v(x_1, t_j)=Z^{-1}vs_1(x_0, t_j)+vs_2(x_1, t_j) \quad \text{(Equation 16)}$$

In other words, the actually measured particle velocity is equal to the sum of the velocity defined by the sound wave from the sound source $s_1$ and the velocity defined by the sound wave from the sound source $s_2$. It is possible to calculate the particle velocity at the position $x_0$ and the particle velocity at the position $x_1$ based on the sound pressures actually measured at the real microphones MIC 0, MIC 1 and MIC 2, so that values of $vs_1(x_0, t_j)$ and $vs_2(x_1, t_j)$ can be estimated by solving the two equations of Equation 16, simultaneously.

Figure 8:
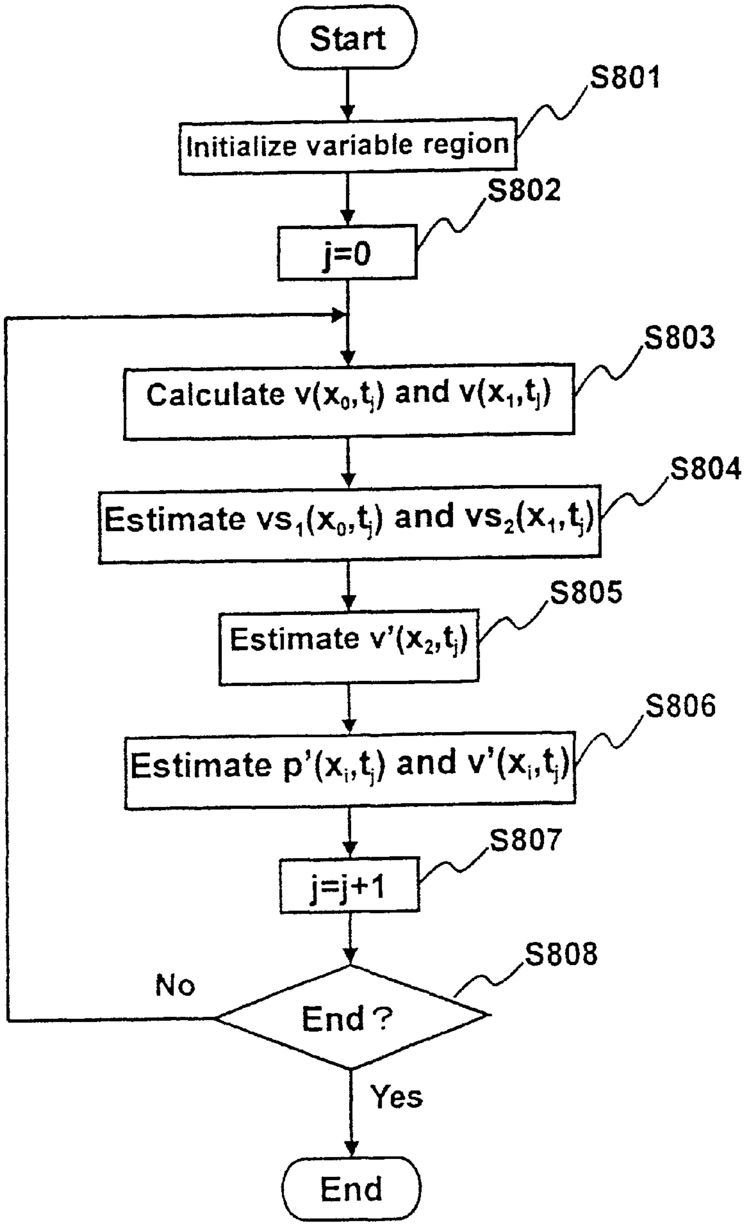
FIG. 8 is a flow chart showing the procedures of an estimator in the fourth embodiment of the present invention.

FIG. 8 is a flow chart showing the procedure of the estimator 104 of this embodiment. As shown in FIG. 8, the estimator 104 of this embodiment first initializes a variable storage region (step S801), then initializes a sampling time j to zero (step S802), and calculates $v(x_0, t_j)$ and $v(x_1, t_j)$ (step S803). This calculation can be performed in the same manner as in Embodiment 2.

Furthermore, $vs_1(x_0, t_j)$ and $vs_2(x_1, t_j)$ are estimated (step S804) by using Equations 17 and 18 below, which are derived from the simultaneous equations of Equation 16.

$$vs_1(x_0, t_j)=vs_1(x_0, t_{j-2})+\{v(x_0, t_j)-v(x_1, t_{j-1})\} \quad \text{(Equation 17)}$$

$$vs_2(x_1, t_j)=vs_2(x_1, t_{j-2})+\{v(x_1, t_j)-v(x_0, t_{j-1})\} \quad \text{(Equation 18)}$$

Furthermore, $v'(x_2, t_j)$, which is necessary for further estimation of $p'(x_i, t_j)$ and $v'(x_i, t_j)$, is estimated (step S805). The estimation of $v'(x_2, t_j)$ is performed with $$v'(x_2, t_j)=vs_1(x_0, t_{j-2})+vs_2(x_1, t_{j+1}). \quad \text{(Equation 19)}$$

Thereafter, the estimator 104 estimates $p'(x_i, t_j)$ and $v'(x_i, t_j)$ (step S806). In the estimation at step S806, Equations 20 and 21 below are used.

$$v'(x_i, t_{j-(n-2)})=vs_1(x_0, t_{j-i-(n-2)})+vs_2(x_1, t_{j+1-(n-1)}) \quad \text{(Equation 20)}$$

$$p'(x_i, t_{j-(n-2)})=p'(x_i, t_{j-(n-1)})+(1/a)\cdot\{v'(x_i, t_{j-(n-2)})-v'(x_{i-1}, t_{j-(n-2)})\} \quad \text{(Equation 21)}$$

The estimation with Equations 20 and 21 is repeated with respect to i=3, 4, . . . , n−1, so that the sound pressure and the particle velocity at an arbitrary position $x_i$ are estimated.

Furthermore, a value of 1 is added to the sampling time j (step S807), and if the process is continued (step S808: No), the procedure returns to step S803.

In the case where the sound sources $s_1$ and $s_2$ are present on the extended line of the x-axis on which three microphones are aligned, the above-described process makes it possible to estimate the sound pressure $p'(x_i, t_j)$ (i=2, 3, . . . , n−1) at an arbitrary position on the extended line.

Embodiment 5

Next, a fifth embodiment of the present invention will be described below. In the microphone array of this embodiment, a virtual border plane is set between two real microphones and a source of a desired signal is present only in one of the regions that are virtually partitioned by the virtual border plane.

Figure 9:
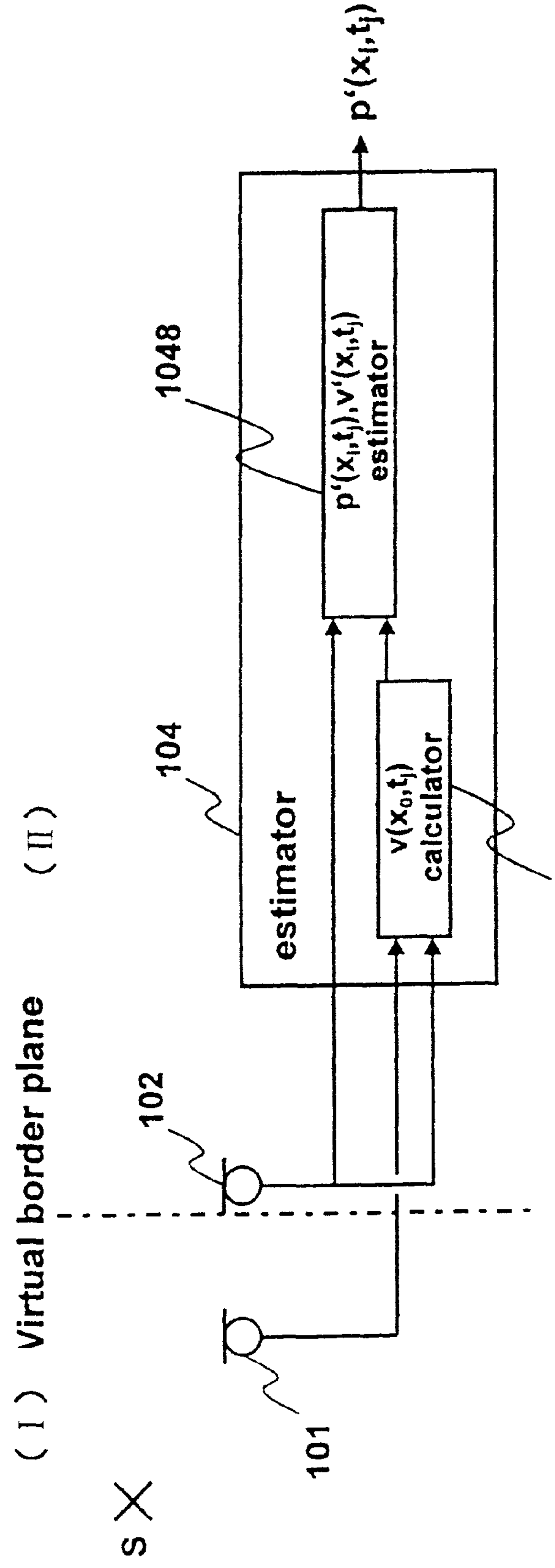
FIG. 9 is a block diagram showing the structure of a microphone array according to a fifth embodiment of the present invention.

FIG. 9 is a block diagram showing the structure of a microphone array of this embodiment. As shown in FIG. 9, in this embodiment, two real microphones are used and the estimator 104 includes a $v(x_0, t_j)$ calculator 1041 and a $p'(x_i, t_j)$, $v'(x_i, t_j)$ estimator 1048.

The virtual border plane in this embodiment is virtually set between two real non-directional microphones, and no sound source is present on one side of the virtual border plane (in this case, side (II) has no sound source as shown in FIG. 9). In other words, the virtual border plane does not exist physically.

Figure 10:
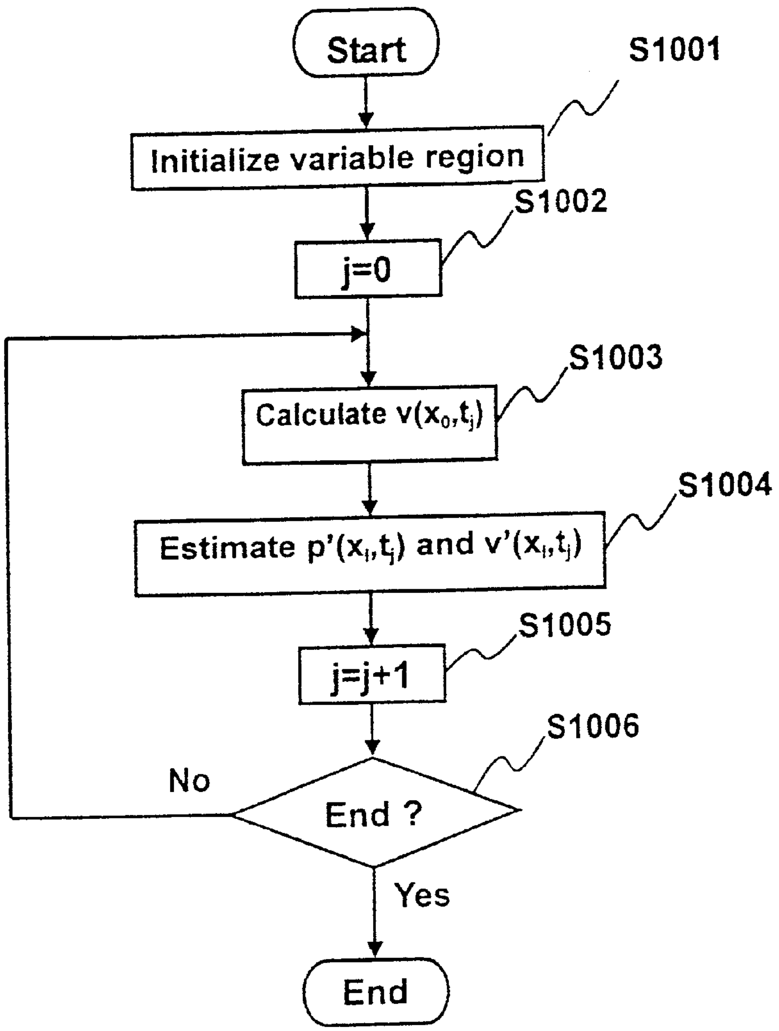
FIG. 10 is a flow chart showing the procedures of an estimator in the fifth embodiment of the present invention.

FIG. 10 is a flow chart showing the procedure of the estimator 104 of this embodiment. As shown in FIG. 10, the estimator 104 of this embodiment first initializes a variable storage region (step S1001), initializes a sampling time j to zero (step S1002), and calculates $v(x_0, t_j)$ (step S1003). In this embodiment, Equation 22 below is used for the calculation for $v(x_0, t_j)$. Equation 22 is the same as Equation 8, except that j+1 is substituted for j in Equation 8.

$$v(x_0, t_{j+1})=v(x_0, t_j)+(1/b)\cdot\{p(x_1, t_j)-p(x_0, t_j)\} \quad \text{(Equation 22)}$$

Furthermore, the estimator 104 estimates $p'x(x_i, t_j)$ and $v'(x_i, t_j)$ (step S1004). In this embodiment, it is assumed that the particle velocity has the relationship expressed by $$v(x_i, t_j)=v(x_{i-1}, t_{j-1}). \quad \text{(Equation 23)}$$

This assumption is made in order to obtain the same effect as that obtained when changing the intervals between the microphones, corresponding to the direction of sound source, in accordance with an area of a space where the microphones are arranged. More specifically, it is possible to obtain the same effect as that obtained when the interval is wide in a wide space and the interval is narrow in a narrow space.

In an actual process, $p'x(x_i, t_j)$ and $v'(x_i, t_j)$ are estimated with $$v'(x_i, t_{j+1})=v'(x_{i-1}, t_j), \text{ and} \quad \text{(Equation 24)}$$

$$p'(x_{i+1}, t_j)=p'(x_i, t_j)+b\cdot\{v'(x_i, t_{j+1})-v'(x_i, t_j)\}. \quad \text{(Equation 25)}$$

When the estimation as described above is completed, a value of 1 is added to j representing a sampling time (step S1005). When the process is continued (step S1006: No), the procedure returns to step S1003.

The above-described process makes it possible to estimate a signal in a position of a virtual microphone, based on signals measured at two microphones, in the case where the sound source is present only in one of the regions of the sound field partitioned by a virtual border plane.

Embodiment 6

Next, a sixth embodiment of the present invention will be described below. In this embodiment, a method for sharpening a directional pattern along the direction of the sound source by using two directional microphones as the real microphones will be described.

Figure 11:
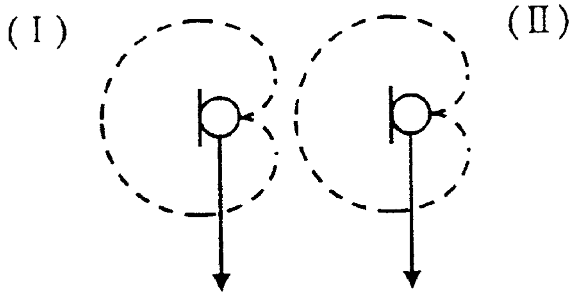
FIGS. 11A and 11B are diagrams illustrating a sixth embodiment of the present invention.
Figure 11:
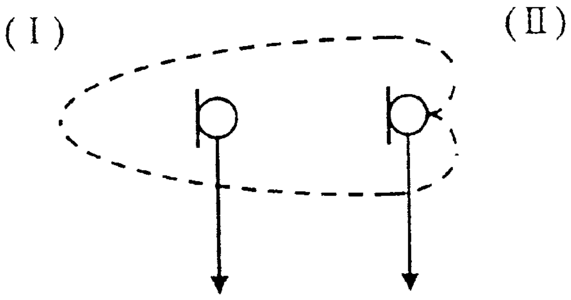

FIGS. 11A and 11B are diagrams illustrating this embodiment. A unidirectional microphone having a directional pattern shown in FIG. 11A is used, and the faces with strong directivity of two microphones are directed to the side (I), and those with weak directivity are directed to the side (II), so that even if a sound source exists on the side (II), the process can be performed in the same manner as in the case where there is no sound source on the side (II).

Furthermore, in the case where the sound source of a desired signal is present on the extended line on which the microphones are aligned, when estimated signals are processed to be in-phase and added, the directional pattern can be sharpened along the direction of the sound source, as shown in FIG. 11B.

Embodiment 7

Next, a seventh embodiment of the present invention will be described below. In this embodiment, the sound source of a desired signal is on the extended line of the x-axis on which three real microphones are aligned, or in a plane perpendicular to the x-axis. A process for enhancing the desired signal in this case will be described below.

Figure 12:
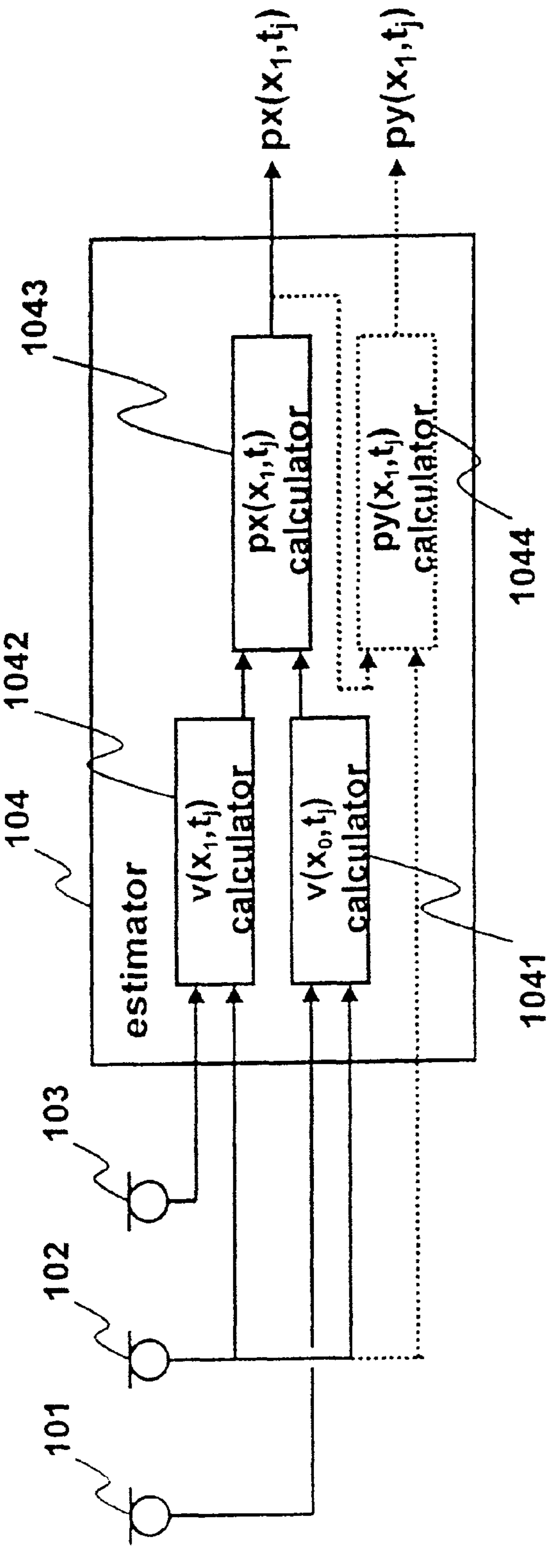
FIG. 12 is a block diagram showing the structure of a microphone array according to a seventh embodiment of the present invention.

FIG. 12 is a block diagram showing the structure of a microphone array of this embodiment. As shown in FIG. 12, three real microphones are used in this embodiment, and the estimator 104 includes a $v(x_0, t_j)$ calculator 1041, a $v(x_1, t_j)$ calculator 1042 and a $px(x_1, t_j)$ calculator 1043. In FIG. 12, a $py(x_1, t_j)$ calculator 1044 is shown by a dotted line. This indicates that the $py(x_1, t_j)$ calculator 1044 can be included optionally, in addition to the $px(x_1, t_j)$ calculator 1043.

As shown in FIG. 12, the structure of the microphone array of this embodiment is the same as that of Embodiment 1, except that the $py(x_1, t_j)$ calculator 1044 is excluded in this embodiment. Therefore, the process of each component is the same as in Embodiment 1.

The above-described structure makes it possible to enhance a desired signal with respect to $px(x_1, t_j)$ with a more simplified structure than that of Embodiment 1, in the case where the sound source of the desired signal is present on the extended line of the coordinate axis on which three real microphones are aligned.

In this embodiment, the process for enhancing the desired signal is performed in the manner as described above, but a process for suppressing noise also can be performed by using the output $px(x_1, t_j)$.

Embodiment 8

Next, an eighth embodiment of the present invention will be described below. In this embodiment, a process of calculating a ratio of sound powers of $px(x_1, t_j)$ to $py(x_1, t_j)$ based on signals received at three real microphones and estimating a direction of the source of a desired signal based on the calculated values will be described.

Sound powers POWx and POWy of $px(x_1, t_j)$ and $py(x_1, t_j)$ are calculated with the sum of squares expressed by.

$$POW_x = \sum_j px(x_1, t_j)^2, \text{ and} \quad \text{(Equation 26)}$$

$$POW_y = \sum_j py(x_1, t_j)^2. \quad \text{(Equation 27)}$$

Figure 13:
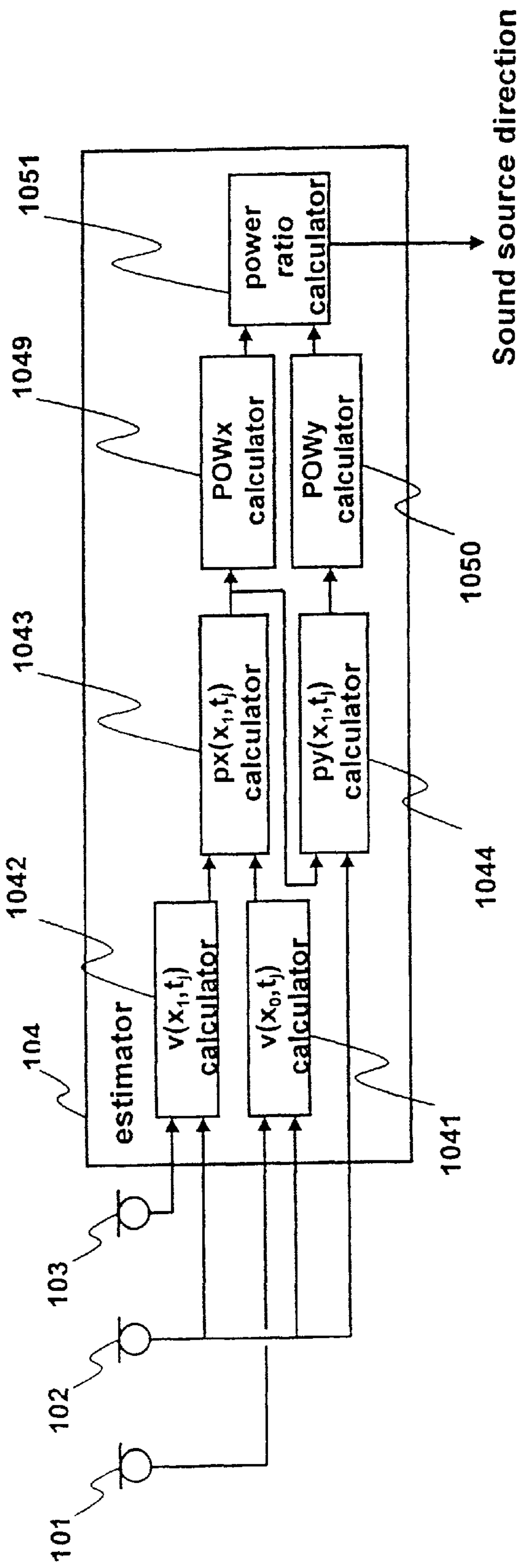
FIG. 13 is a block diagram showing the structure of a microphone array according to an eighth embodiment of the present invention.

FIG. 13 is a block diagram showing the structure of a microphone array of this embodiment. As shown in FIG. 13, three real microphones are used in this embodiment, and the estimator 104 includes a $v(x_0, t_j)$ calculator 1041, a $v(x_1, t_j)$ calculator 1042, a $px(x_1, t_j)$ calculator 1043, a $py(x_1, t_j)$ calculator 1044, a POWx calculator 1049, a POWy calculator 1050 and a power ratio calculator 1051.

The $v(x_0, t_j)$ calculator 1041, the $v(x_1, t_j)$ calculator 1042 and the $px(x_1, t_j)$ calculator 1043 and the $py(x_1, t_j)$ calculator 1044 are not further described because they perform the same process as described in the preceding embodiments.

The POWx calculator 1049 and a POWy calculator 1050 calculate sound powers in accordance with Equations 26 and 27.

The power ratio calculator 1051 calculates a sound power ratio based on the sound powers calculated by the POWx calculator 1049 and a POWy calculator 1050, so as to output the direction of the source of the desired signal. The following describes how the position of the sound source is estimated based on the sound power ratio.

Figure 14:
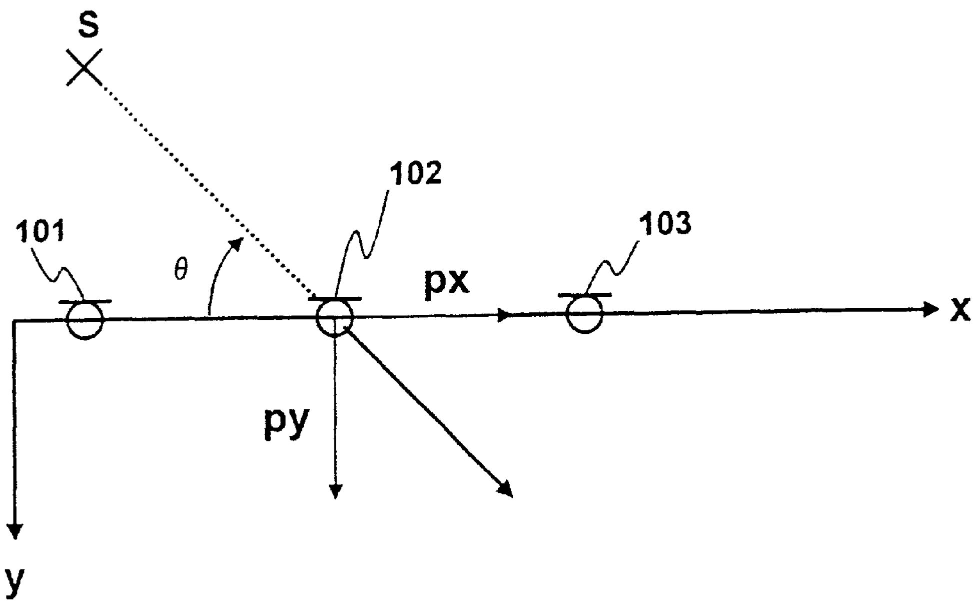
FIG. 14 is a diagram illustrating a method for estimating the direction of a sound source, based on a sound power ratio in the eighth embodiment of the present invention.

FIG. 14 is a diagram illustrating a method for estimating a direction of a sound source. Three real microphones are provided, as shown in FIG. 14, and a sound source S is present in the position shown in FIG. 14. The direction of the source of the desired signal in FIG. 14 is denoted by an angle θ. The microphone array of this embodiment estimates the angle θ. The direction of the sound source is estimated in the form that the sound source is on a curved surface forming an angle θ with respect to the x-axis.

As described above, in the microphone array of this embodiment, the angle θ and values of px and py calculated by the $px(x_1, t_j)$ calculator 1043 and the $py(x_1, t_j)$ calculator 1044 satisfy the relationship expressed by $$\theta = \tan^{-1}(py/px). \quad \text{(Equation 28)}$$

However, in the microphone array of this embodiment, in order to average fluctuation of sound pressure levels, the angle θ is estimated as a ratio of square roots of the sums of square. The power sound calculator 1051 calculates and outputs a value for θ, based on the sound powers calculated by the POWx calculator 1049 and the POWy calculator 1050 in accordance with $$\theta = \tan^{-1}(\sqrt{POWy}/\sqrt{POWx}). \quad \text{(Equation 29)}$$

Figure 15:
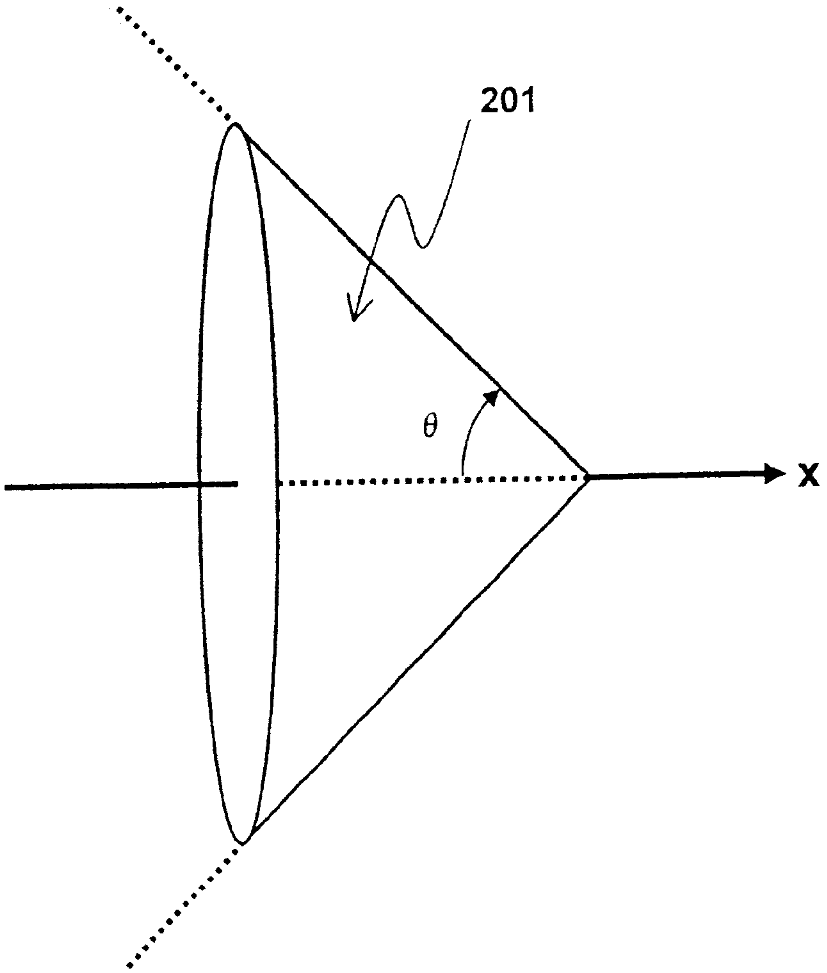
FIG. 15 is a diagram illustrating the estimation of the direction of the sound source in the eighth embodiment of the present invention.

FIG. 15 is a diagram illustrating estimation of the sound source position. It is possible to determine that the sound source is on a curved surface 201 forming an angle θ with the x-axis, as shown in FIG. 15, by obtaining of the angle θ.

Thus, the use of the microphone of this embodiment makes it possible to estimate the direction of the sound source.

Embodiment 9

Next, a ninth embodiment of the present invention will be described below. In this embodiment, the sound source of a desired signal is present on the extended line of the x-axis on which three real microphones are aligned or in a plane perpendicular to the x-axis. A process for enhancing the desired signal in these cases will be described below.

Figure 16:
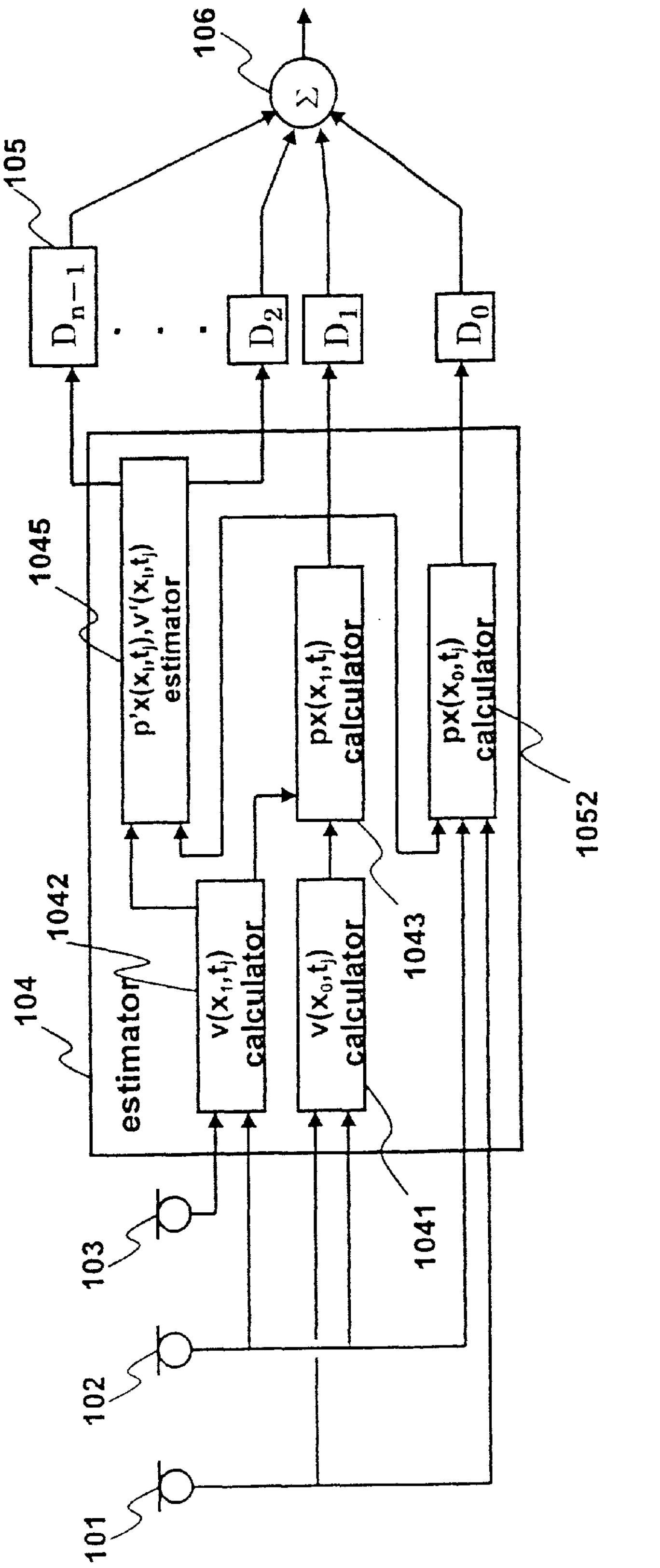
FIG. 16 is a block diagram showing the structure of a microphone array according to a ninth embodiment of the present invention.

FIG. 16 is a block diagram showing the structure of a microphone array of this embodiment. As shown in FIG. 16, three real microphones are used in this embodiment, and the estimator 104 includes a $v(x_0, t_j)$ calculator 1041, a $v(x_1, t_j)$ calculator 1042, a $px(x_1, t_j)$ calculator 1043, a $p'x(x_i, t_j)$, $v'(x_i, t_j)$ estimator 1045, and a $px(x_0, t_j)$ calculator 1052.

The $v(x_0, t_j)$ calculator 1041, the $v(x_1, t_j)$ calculator 1042 and the $px(x_1, t_j)$ calculator 1043, and the $p'x(x_i, t_j)$, $v'(x_i, t_j)$ estimator 1045 are not further described because they perform the same process as described in the preceding embodiments.

The $px(x_0, t_j)$ calculator 1052 calculates a value of $px(x_0, t_j)$ based on output from the real microphones MIC 0 and MIC 1 and output from the $px(x_1, t_j)$ calculator 1043. More specifically, $py(x_1, t_j)$, i.e., $py(x_0, t_j)$ is calculated based on a signal received at the real microphone MIC 1 and a value of $px(x_1, t_j)$. Then, $px(x_0, t_j)$ is obtained by subtracting $py(x_0, t_j)$ from the sound pressure $p(x_0, t_j)$ detected by the real microphone MIC 0.

The sound pressures in the x-axis direction that are output from the $px(x_0, t_j)$ calculator 1052, the $px(x_1, t_j)$ calculator 1043 and the $p'x(x_i, t_j)$, $v'(x_i, t_j)$ estimator 1045 are input to corresponding delay units of the plurality of delay units 105, so that the desired signal can be enhanced. However, since the microphone array of this embodiment processes only sound pressures in the x-axis direction to be in-phase and the in-phase signals to be added, it can be used only when the source of the desired signal is present on the extended line of the x-axis.

The above-described structure, which includes a small number of microphones, can provide the same accuracy as a microphone array including a large number of microphones, if the source of the desired signal is present on the extended line of the coordinate axis on which the real microphones are aligned.

In this embodiment, the process for enhancing the desired signal is performed in the manner as described above, but a process for suppressing noise also can be performed by using a subtraction type array, if the sound source of noise is not present on the extended line of the x-axis.

Embodiment 10

Next, a tenth embodiment of the present invention will be described below. In this embodiment, in addition to the structure described in Embodiment 8, a sound pressure in an arbitrary position $x_i$ is estimated and a sound power of the estimated signal is calculated, so that the position of the source of the desired signal is estimated based on a ratio of the calculated sound powers.

The estimation of sound signals, the calculation of sound powers and the calculation of the ratio of the sound powers are not further described here because they are performed in the same manner as in Embodiments 1 and 8.

Figure 17:
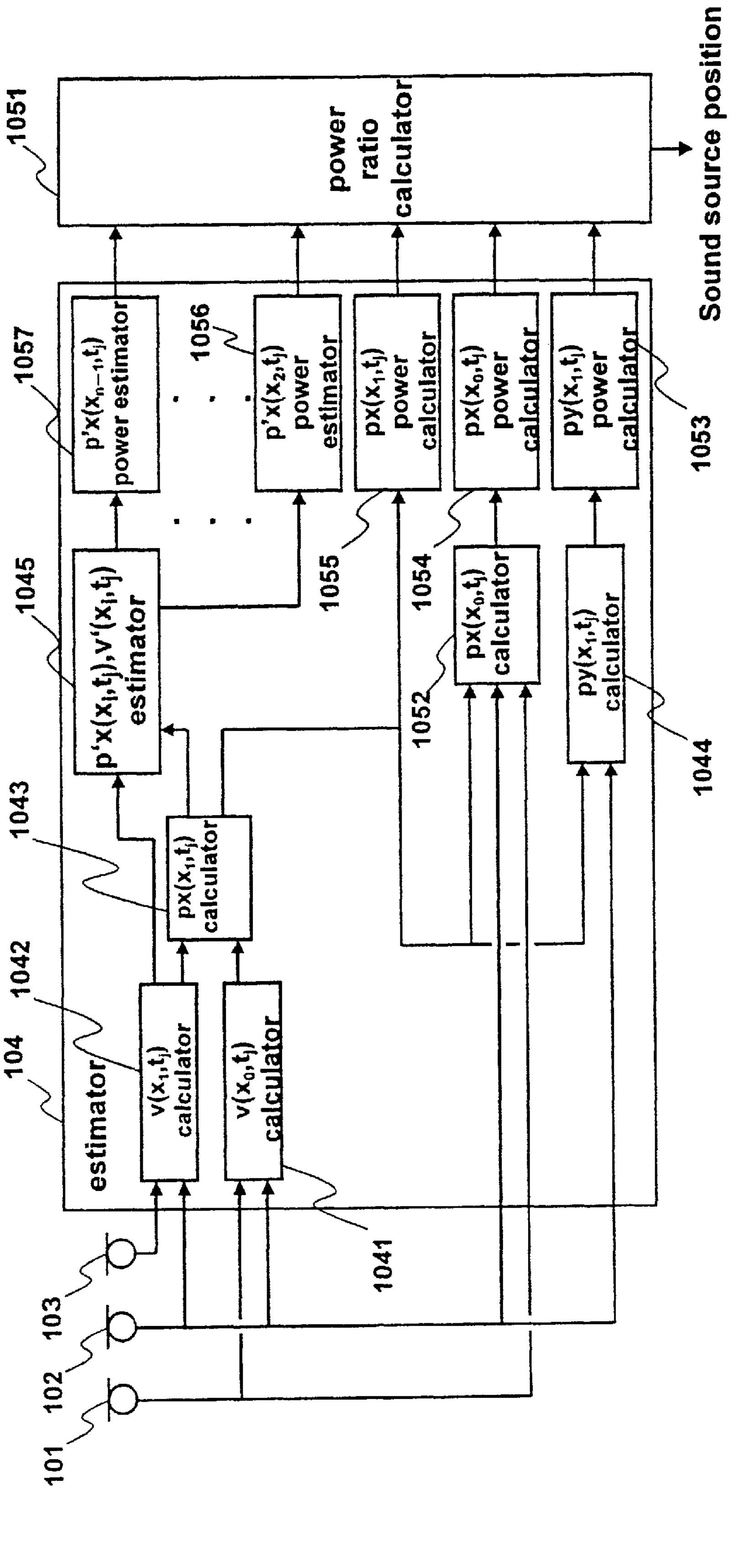
FIG. 17 is a block diagram showing the structure of a microphone array according to a tenth embodiment of the present invention.

FIG. 17 is a block diagram showing the structure of the microphone array of this embodiment. As shown in FIG. 17, three real microphones are used in this embodiment, and the estimator 104 includes a $v(x_0, t_j)$ calculator 1041, a $v(x_1, t_j)$ calculator 1042, a $px(x_1, t_j)$ calculator 1043, a $py(x_1, t_j)$ calculator 1044, a $p'x(x_i, t_j)$, $v'(x_i, t_j)$ estimator 1045, a $px(x_0, t_j)$ calculator 1052, and a power ratio calculator 1051.

The estimator 104 also includes a sound power calculator for calculating a sound power based on an estimated sound pressure. The number of the sound power calculator depends on the number of virtual microphones whose sound pressures are estimated. In the case of FIG. 17, where (n−3) virtual microphones are present, (n−3) sound power calculators from a $p'x(x_2, t_j)$ power estimator 1056 to a $p'x(x_{n-1}, t_j)$ power estimator 1057 are provided. The estimator 104 further includes sound power calculators for calculating sound powers corresponding to sound pressures actually measured by the real microphone, namely, a $px(x_0, t_j)$ power calculator 1054, a $px(x_1, t_j)$ power calculator 1055, and a $py(x_1, t_j)$ power calculator 1053. The $p'x(x_2, t_j)$ power estimator 1056 may calculate a power of an estimated value of $p'x(x_2, t_j)$, or it may calculate a power of $px(x_2, t_j)$ obtained by subtracting $py(x_2, t_j)$, i.e., $py(x_0, t_j)$ from the signal measured at MIC 2.

The $v(x_0, t_j)$ calculator 1041, the $v(x_1, t_j)$ calculator 1042 and the $px(x_1, t_j)$ calculator 1043, the $py(x_1, t_j)$ calculator 1044, the $p'x(x_i, t_j)$, $v'(x_i, t_j)$ estimator 1045 and the $px(x_0, t_j)$ calculator 1052 are not further described because they perform the same process as described in the preceding embodiments.

The power calculators in this embodiment calculate the sound powers of the real microphones according to Equation 26 and 27, as described in Embodiment 8. In this embodiment, however, the sound powers of estimated signals of the virtual microphones are also calculated, whereas only the sound powers of the real microphones are calculated in Embodiment 8.

The power calculators and estimators 1053 to 1057 calculate powers of sound signals obtained at the real microphones and the virtual microphones, based on the sound pressures in the x-axis direction calculated or estimated by the $p'x(x_i, t_j)$, $v'(x_i, t_j)$ estimator 1045, the $px(x_1, t_j)$ calculator 1043, and the $px(x_0, t_j)$ calculator 1052 and the sound pressures in the y-axis direction calculated by the $py(x_1, t_j)$ calculator 1044.

The power ratio calculator 1051 calculates a sound power ratio based on sound powers calculated by the power calculators and estimators 1053 to 1057, and determines an angle θ of the source of the desired signal with respect to each real microphone and virtual microphone to the x-axis. The angle θ of the source of the desired signal can be obtained from the ratio of sound powers in the same manner as in Embodiment 8.

Since the sound powers of estimated signals are calculated in this embodiment, it is possible to estimate the directions of the source of the desired signal from the positions of the virtual microphones. In Embodiment 8, it is possible to estimate only that the sound source is present on a specific curved surface, whereas it is possible to estimate the position of the sound source in a more limited range in this embodiment.

Figure 18:
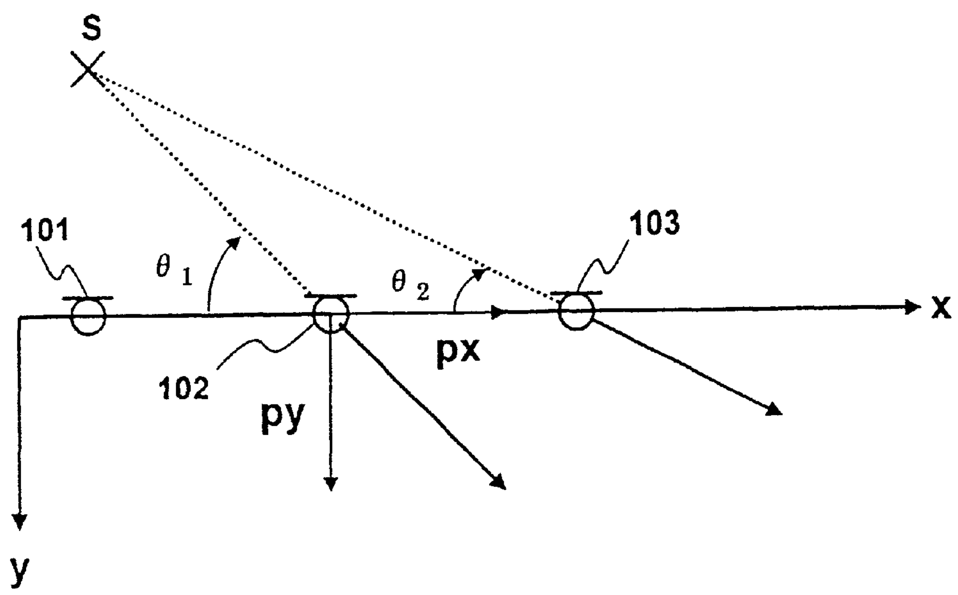
FIG. 18 is a diagram illustrating a method for estimating the position of a sound source, based on a sound power ratio in the tenth embodiment of the present invention.
Figure 19:
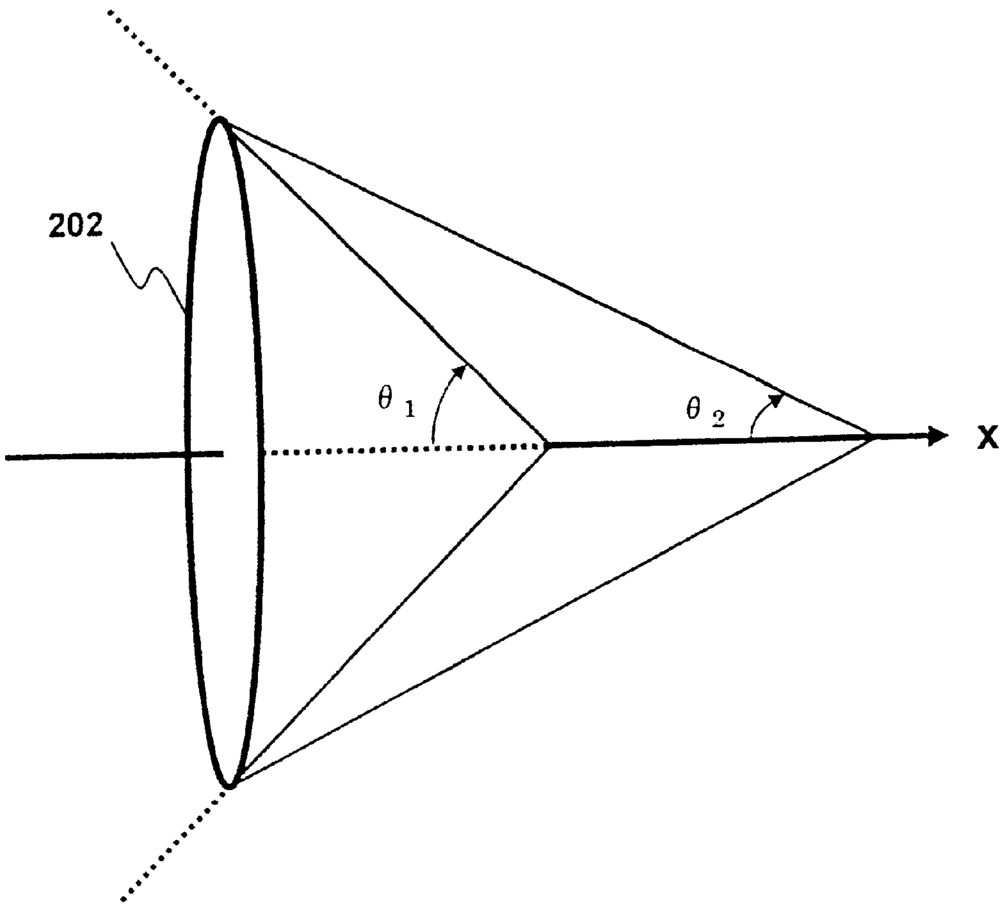
FIG. 19 is a diagram illustrating the estimation of the position of the sound source in the tenth embodiment of the present invention.

FIG. 18 is a diagram showing estimation of the position of the sound source by the microphone array of this embodiment. As shown in FIG. 18, the use of the microphone array of this embodiment makes it possible to estimate the directions of the source of the desired signal ($\theta_1$ and $\theta_2$ in the example shown in FIG. 18) from a plurality of positions. Therefore, the position of the sound source can be estimated in a more limited range. More specifically, it is possible to estimate the position of the source of the desired signal on a circumference 202 shown in FIG. 19.

Thus, the use of the microphone array of this embodiment makes it possible to estimate not only the direction of the sound source, as described in Embodiment 8, but also the position of the sound source in a more limited range.

Embodiment 11

Next, an eleventh embodiment of the present invention will be described below. In this embodiment, sound signals actually obtained by the real microphones and estimated signals are used to enhance a desired signal.

Figure 20:
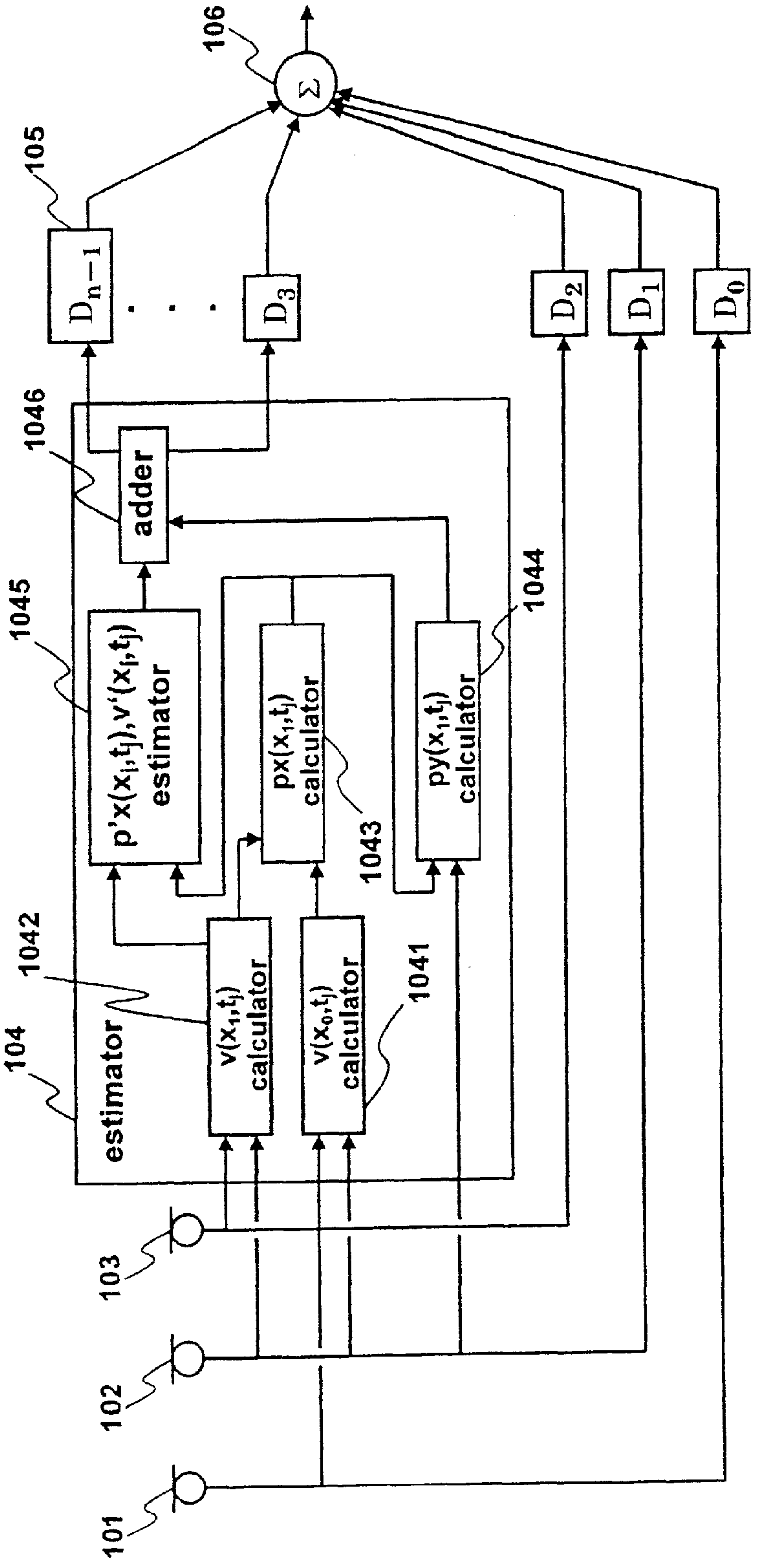
FIG. 20 is a block diagram showing the structure of a microphone array according to an eleventh embodiment of the present invention.

FIG. 20 is a block diagram showing the structure of the microphone array of this embodiment. As shown in FIG. 20, in this embodiment, three real microphones are used. The estimator 104 includes a $v(x_0, t_j)$ calculator 1041, a $v(x_1, t_j)$ calculator 1042, a $px(x_1, t_j)$ calculator 1043, a $py(x_1, t_j)$ calculator 1044, a $p'x(x_i, t_j)$, $v'(x_i, t_j)$ estimator 1045, and an adder 1046.

The $v(x_0, t_j)$ calculator 1041, the $v(x_1, t_j)$ calculator 1042, the $px(x_1, t_j)$ calculator 1043, the $py(x_1, t_j)$ calculator 1044, and the $p'x(x_i, t_j)$, $v'(x_i, t_j)$ estimator 1045 are not further described because they perform the same process as described in the preceding embodiments.

In the microphone array of this embodiment, sound signals obtained by the real microphones MIC 0, MIC 1 and MIC 2 are input to the corresponding delay units 105. In addition to that, sound pressures in the x-axis direction estimated by the $p'x(x_i, t_j)$, $v'(x_i, t_j)$ estimator 1045 and sound pressures in the y-axis direction calculated by the $py(x_1, t_j)$ calculator 1044 are added in the adder 1046 and the result is input to a corresponding delay unit 105.

Furthermore, output from the delay units 105 is added in the adder 106, so that the desired signal can be enhanced.

Thus, the microphone array in this embodiment, which includes only a small number of real microphones, can provide the same level of accuracy as a microphone array, which includes a large number of microphones.

In this embodiment, the process for enhancing the desired signal has been described, but this embodiment can also be applied to a process for suppressing noise by inputting sound signals obtained by the real microphones and estimated signals to a subtraction type array.

Embodiment 12

Next, a twelfth embodiment of the present invention will be described below. In this embodiment, the position of a source of a desired signal is estimated by calculating correlation coefficients.

Figure 21:
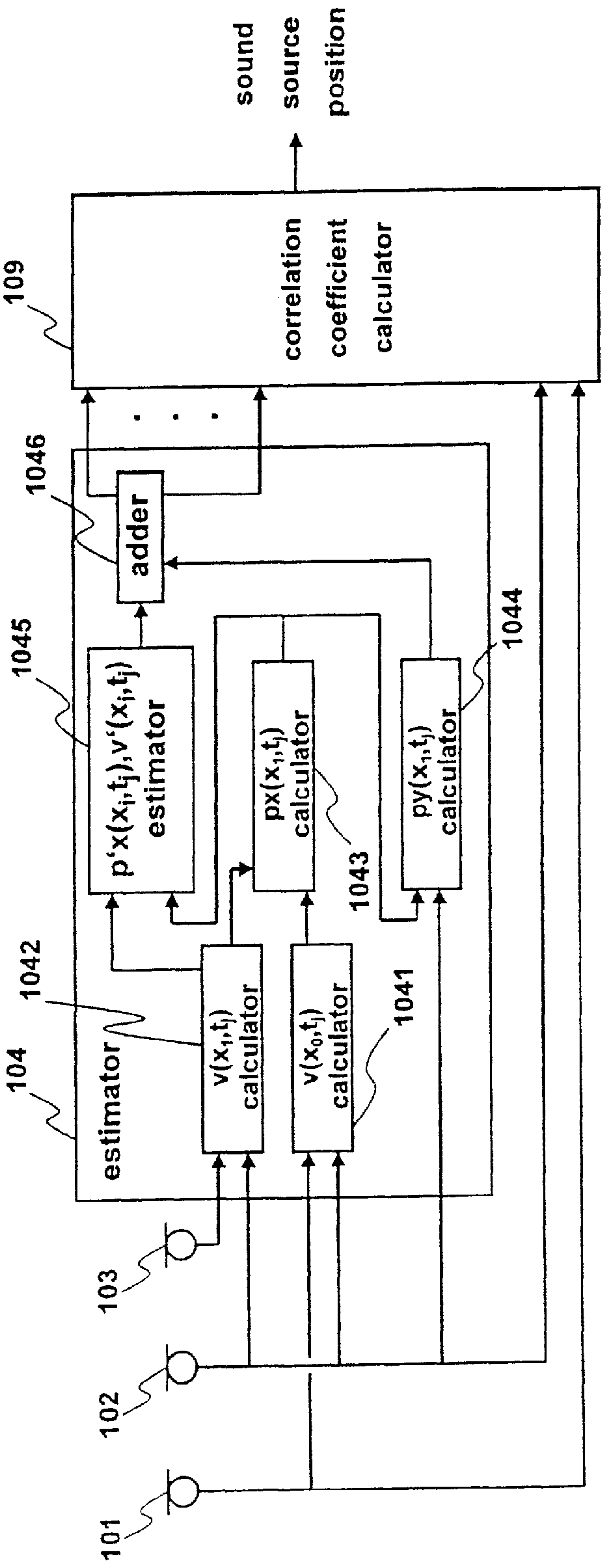
FIG. 21 is a block diagram showing the structure of a microphone array according to a twelfth embodiment of the present invention.

FIG. 21 is a block diagram showing the structure of the microphone array of this embodiment. As shown in FIG. 21, this embodiment uses three real microphones, and the estimator 104 has the same structure as in Embodiment 11.

The estimator 104 in this embodiment includes a $v(x_0, t_j)$ calculator 1041, a $v(x_1, t_j)$ calculator 1042, a $px(x_1, t_j)$ calculator 1043, a $py(x_1, t_j)$ calculator 1044, a $p'x(x_i, t_j)$, $v'(x_i, t_j)$ estimator 1045, and an adder 1046. The process of each component is not further described here.

In the microphone array of this embodiment, sound signals obtained by the real microphones MIC 0, and MIC 1 are input to a correlation coefficient calculator 109. In addition to that, sound pressures in the x-axis direction estimated by the $p'x(x_i, t_j)$, $v'(x_1, t_j)$ estimator 1045 and sound pressures in the y-axis direction calculated by the $py(x_1, t_j)$ calculator 1044 are added in the adder 1046 and the output results are input to the correlation coefficient calculator 109.

The correlation coefficient calculator 109 calculates correlation coefficients based on the input signals. The correlation coefficients are calculated by a method specifically described in "Speech Input Interface With Microphone Array" (FUJITSU. 49, 1, pp80–84 (January 1998)). A brief description of this method follows.

Correlation coefficients indicate the correlation between two signals. In the calculation method of this embodiment, the correlation coefficient is a value from −1 to 1, and the correlation coefficient of an uncorrelated signal is zero. The correlation coefficients $R_{01}(k)$ and $R_{12}(k)$ of input signals $\mathbf{M0}(t_g)$, $\mathbf{M1}(t_g)$ and $\mathbf{M2}(t_g)$ from the three microphones MIC 0, MIC 1 and MIC 2 are calculated with $$R_{01}(k) = \frac{\sum_{g=0} \{M0(t_g - k) \cdot M1(t_g)\}}{\sqrt{\sum_{g=0} M0(t_g - k)^2} \sqrt{\sum_{g=0} M1(t_g)^2}} \quad \text{(Equation 30)}$$

$(k = -n_{01}, \ldots, 0, \ldots, n_{01})$, and $$R_{12}(k) = \frac{\sum_{g=0} \{M2(t_g - k) \cdot M1(t_g)\}}{\sqrt{\sum_{g=0} M2(t_g - k)^2} \sqrt{\sum_{g=0} M1(t_g)^2}} \quad \text{(Equation 31)}$$

$(k = -n_{12}, \ldots, 0, \ldots, n_{12})$ where $t_g$ represents a sampling time. $n_{01}$ and $n_{12}$ are defined as $$n_{01} = h_{01}/c \cdot Fs, \text{ and} \quad \text{(Equation 32)}$$

$$n_{12} = h_{12}/c \cdot Fs, \quad \text{(Equation 33)}$$

where $h_{01}$ is an interval between the real microphones MIC 0 and MIC1, $h_{12}$ is an interval between the real microphones MIC 1 and MIC 2, c is the velocity of sound, and Fs is a sampling frequency.

Next, a method for estimating the position of the source of a desired signal based on the correlation coefficients obtained by the above-described equations will be described.

First, the product $r(x'_i, y'_j)$ of the correlation coefficients $R_{01}(k)$ and $R_{12}(k)$ in a position defined by coordinates $(x'_i, y'_j)$ is calculated, as $$r(x'_i, y'_j) = R_{01}(k_{01}) \cdot R_{12}(k_{12}), \text{ where} \quad \text{(Equation 34)}$$

$$k_{01} = \frac{Fsh_{01} \sin\left\{\tan^{-1}\left(\frac{y'_j - y_1}{x'_i - x_1}\right) - \theta_{01}\right\}}{c}$$

$$k_{12} = \frac{Fsh_{12} \sin\left\{\tan^{-1}\left(\frac{y'_j - y_1}{x_1 - x'_i}\right) - \theta_{12}\right\}}{c}$$

In Equation 34, $(x_1, y_1)$ are the coordinates of the position of MIC 1, $\theta_{01}$ is an angle formed by the x-axis and a line perpendicular to the line connecting MIC 0 and MIC1, and $\theta_{12}$ represents an angle formed by the x-axis and a line perpendicular to a line connecting MIC 1 and MIC2. A threshold for the product of these correlation coefficients is predetermined, and when a value of the product $r(x'_i, y'_i)$ is equal to or more than the threshold, it is determined that the source of the desired signal is in the position defined by these coordinates.

The above-described process in the correlation coefficient calculator 109 makes it possible to estimate the coordinates of the position of the source of the desired signal and output it.

Thus, the microphone array of this embodiment, which includes only a small number of microphones, makes it possible to estimate the position of the source of the desired signal with the same level of accuracy as a microphone array including a large number of microphones.

Embodiment 13

Next, a thirteenth embodiment will be described below. In this embodiment, a method for performing a process without difficulties by removing sounds other than a sound coming from the source of a desired signal when a virtual border plane is provided as in Embodiment 5, the source of a desired signal is on one side of the virtual border plane and the source of a sound that is desired to be removed is on the opposite side of the virtual border plane will be described.

Figure 22:
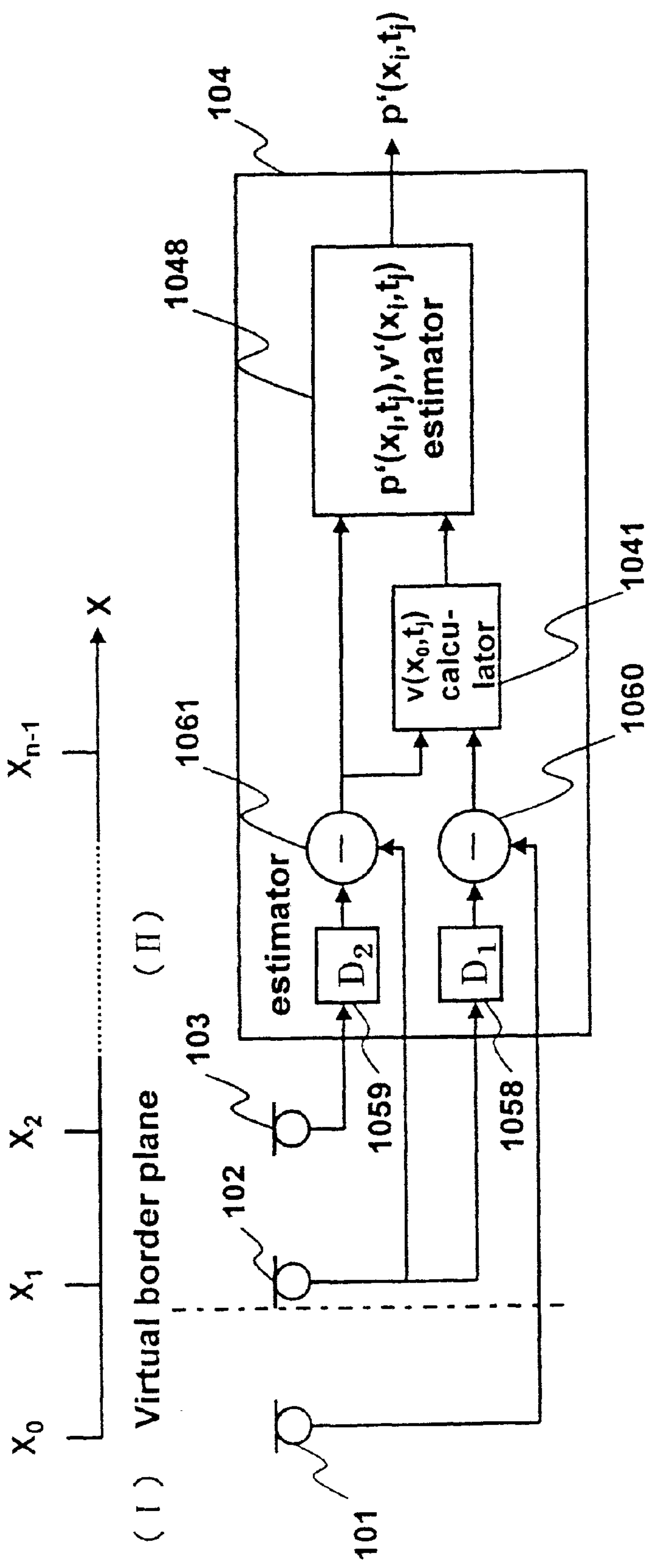
FIG. 22 is a block diagram showing the structure of a microphone array according to a thirteenth embodiment of the present invention.

FIG. 22 is a block diagram showing the structure of a microphone array of this embodiment. As shown in FIG. 22, this embodiment uses three real microphones, and a virtual border plane as described in Embodiment 5 is set between MIC 0 and MIC 1. The estimator 104 in this embodiment includes two delay units $D_1$ 1058 and $D_2$ 1059, and two subtracters 1060 and 1061, in addition to the $v(x_0, t_j)$ calculator 1041 and the $p'(x_i, t_j)$, $v'(x_i, t_j)$ estimator 1048.

In the microphone array of this embodiment, sound signals received by MIC 1 are input to the delay unit $D_1$ 1058, and the subtracter 1060 subtracts the signals received by MIC 0 from the signals processed by the delay unit $D_1$ 1058. The processed signals are input to the $v(x_0, t_j)$ calculator 1041.

On the other hand, sound signals received by MIC 2 are input to the delay unit $D_2$ 1059, and the subtracter 1061 subtracts the signals received by MIC 1 from the signals processed by the delay unit $D_2$ 1059. The processed signals are input to the $v(x_0, t_j)$ calculator 1041 and the $p'(x_i, t_j)$, $v'(x_i, t_j)$ estimator 1048.

Signals output from the $v(x_0, t_j)$ calculator 1041 are input to the $p'(x_i, t_j)$, $v'(x_i, t_j)$ estimator 1048.

In the microphone array of this embodiment, a subtraction process as described above makes it possible to realize a unidirectional microphone by using MIC 0 and MIC 1, and realize another unidirectional microphone by using MIC 1 and MIC 2. In this case, the direction with strong directionality is directed to the side (I), and the direction with weak directionality is directed to the side (II), so that a process can be performed without difficulties even when the source of a sound signal other than a desired signal is on the side (II) shown in FIG. 22.

Hereinafter, the number of delay samples $ND_1$ and $ND_2$ of the delay units $D_1$ 1058 and $D_2$ 1059 of this embodiment will be described. The number of delay samples $ND_1$ and $ND_2$ of the delay units $D_1$ and $D_2$ of this embodiment can be obtained with $$ND_1 = (x_1 - x_0)/c * Fs, \text{ and} \quad \text{(Equation 35)}$$

$$ND_2 = (x_2 - x_1)/c * Fs, \quad \text{(Equation 36)}$$

where c is the velocity of sound, and Fs is a sampling frequency.

The above-described process makes it possible to enhance a source of a desired signal without difficulties even when the sound source of noise is present on the opposite side of the virtual border plane. Furthermore, input of signals from MIC 0 to the delay unit $D_1$ and signals from MIC 1 to the delay unit $D_2$ makes it possible to direct the directivity to the side (II) so as to enhance a sound from the sound source on the side (II) by removing a sound on the side (I), which is not coming from the source of a desired signal.

Embodiment 14

Next, a fourteenth embodiment of the present invention will be described below. In this embodiment, a method for detecting a direction of the source of the desired signal by physically rotating a microphone array including real microphones will be described.

Figure 23:
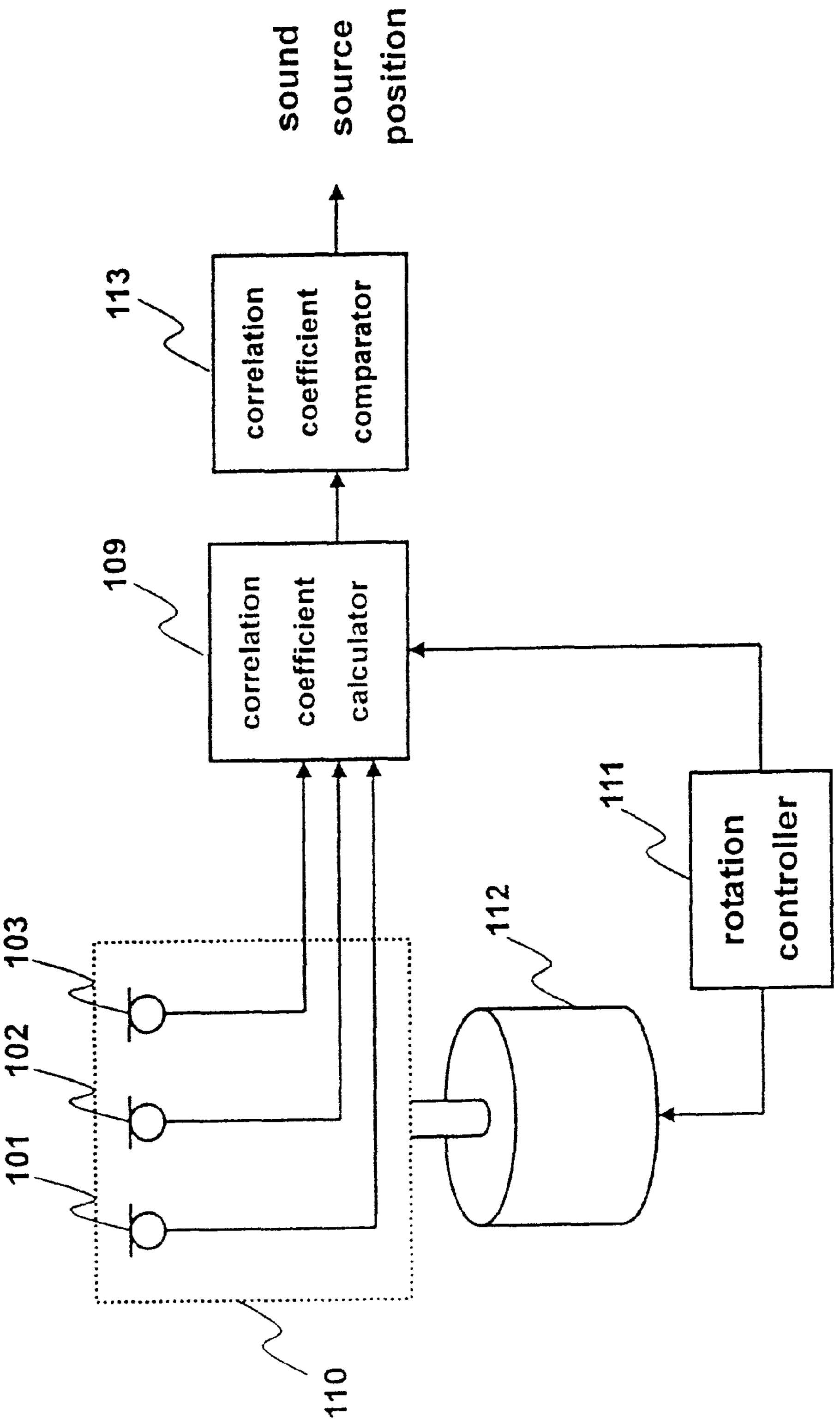
FIG. 23 is a block diagram showing the structure of a microphone array according to a fourteenth embodiment of the present invention.

FIG. 23 is a block diagram showing the structure of the microphone array of this embodiment. As shown in FIG. 23, three real microphones are provided on a rotator 110, which is rotated by a motor 112 controlled by a rotation controller 111.

The rotation controller 111 controls a rotation angle θ of the rotator 110 and transmits the rotation angle θ to a correlation coefficient calculator 109.

The correlation coefficient calculator 109 calculates correlation coefficients in the same manner as in Embodiment 12. The calculated correlation coefficients in this embodiment are transmitted to a correlation coefficient comparator 113.

The correlation coefficient comparator 113 compares correlation coefficients every time correlation coefficients are transmitted, so that the angle θ at which the correlation coefficient becomes the maximum is detected. Since the angle θ at which the correlation coefficient becomes the maximum indicates the direction of the sound source, the angle θ can be output as the direction of the source of the desired signal. It is possible to detect the position of the source of the desired signal by detecting the direction of the source of the desired signal while changing the rotation angle θ. When the microphone array is used while maintaining the state after the position of the source of the desired signal has been detected, the source of the desired signal can be enhanced satisfactorily.

Thus, the use of the microphone array of this embodiment makes it possible to estimate the direction of the source of the desired signal precisely and, for example, enhance the source of the desired signal more satisfactorily, with a small number of real microphones.

In this embodiment, the case where the relative positions of the real microphones are fixed and only the angle can be changed has been described. However, for example, an increase of the number of points where the source of the desired signal is detected while changing the position of the entire microphone array by means of wheels and detecting the position of the microphone array can improve the accuracy of detecting the position of the source of the desired signal.

Embodiment 15

Next, a fifteenth embodiment of the present invention will be described below. In this embodiment, a method for appropriately enhancing a voice signal from a source of a desired signal (a speaker in this embodiment) even in an environment with a high noise level will be described.

Figure 24:
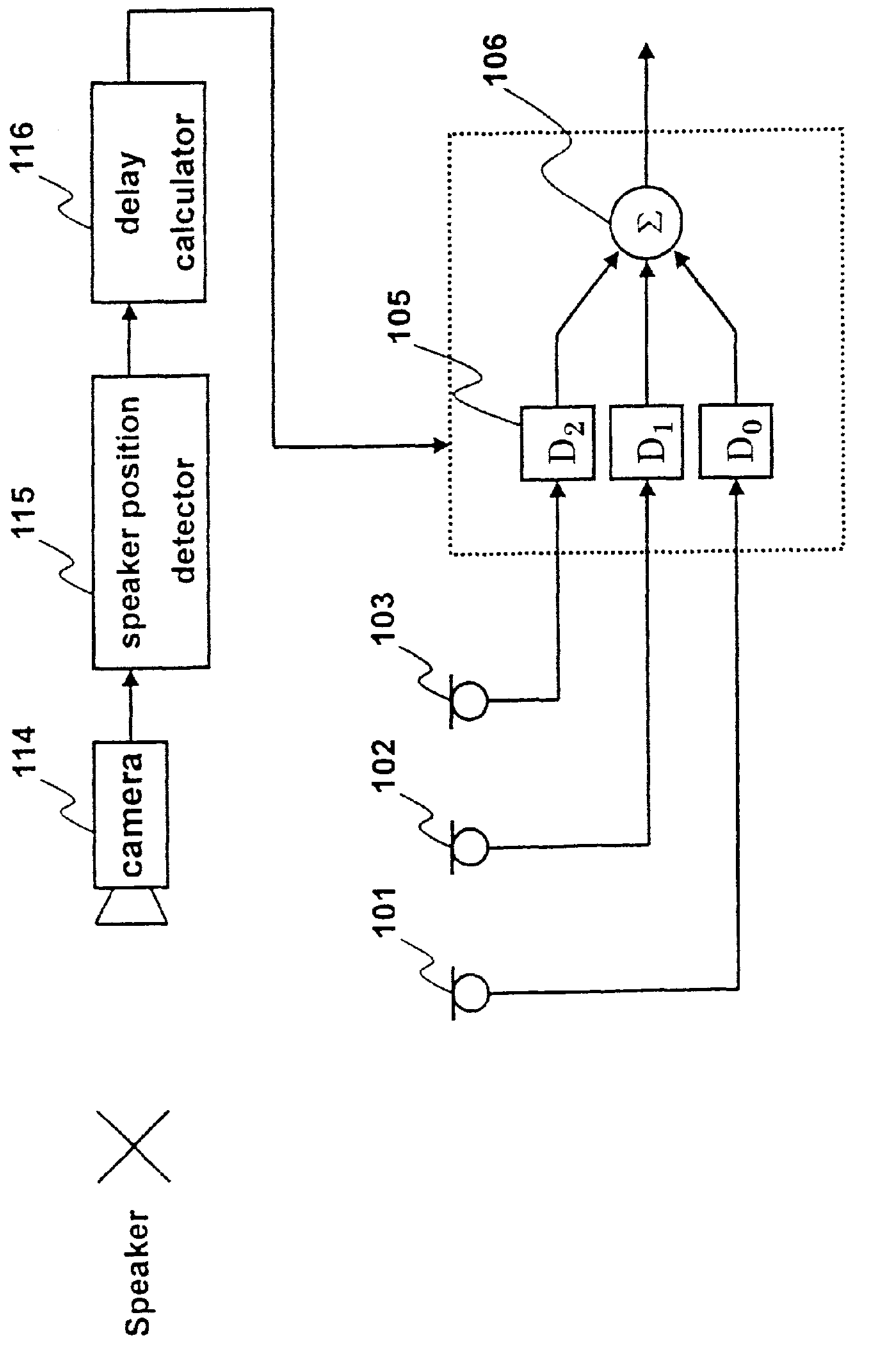
FIG. 24 is a block diagram showing the structure of a microphone array according to a fifteenth embodiment of the present invention.
Figure 25:
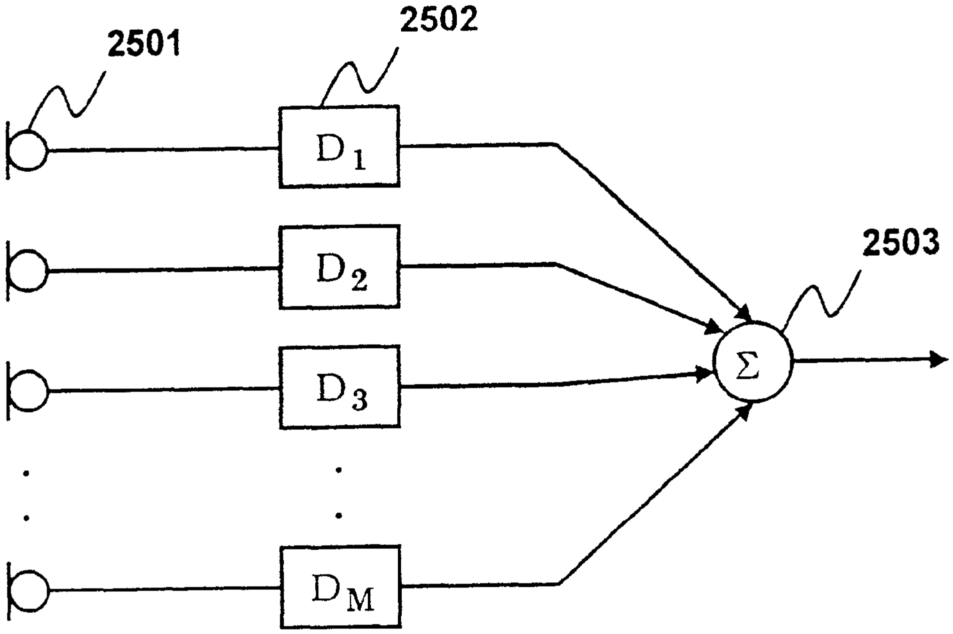
FIG. 25 is an example of the structure of a conventional delay-and-sum array.
Figure 26:
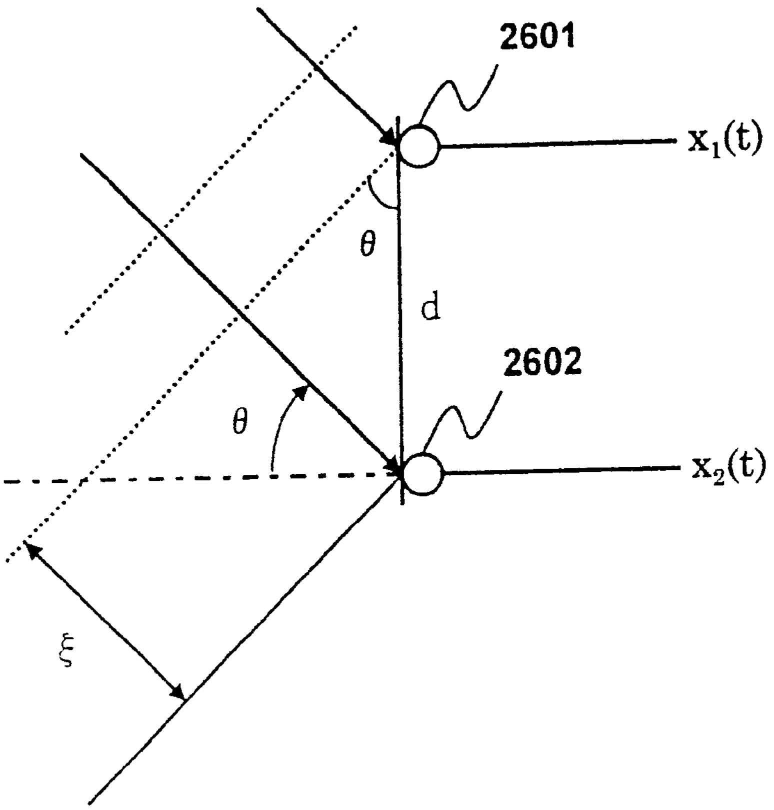
FIG. 26 is a diagram illustrating enhancement of a desired signal in the delay-and-sum array.
Figure 27:
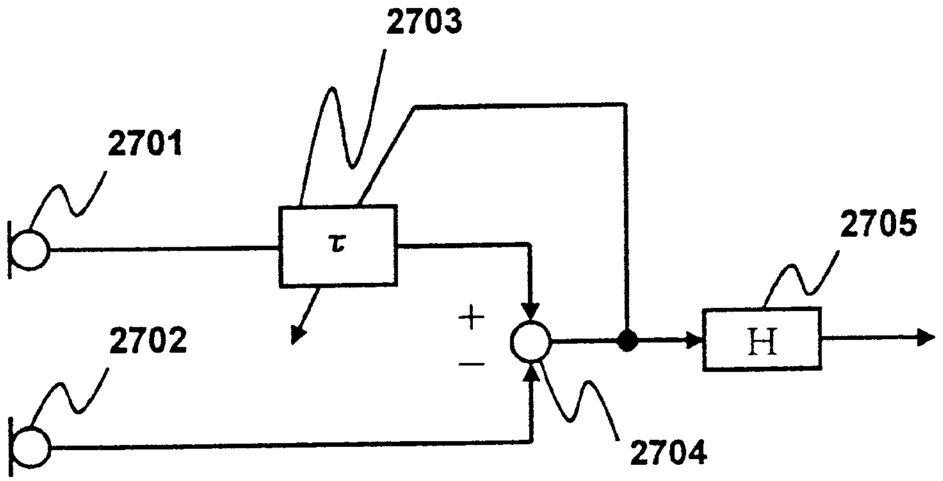
FIG. 27 is an example of the structure of a conventional subtraction type array.

FIG. 24 is a block diagram showing the structure of a microphone array of this embodiment. As shown in FIG. 24, in this embodiment, three real microphones are used to enhance a source of a desired signal by using a plurality of delay units 105 and an adder 106 based on the principle of the delay-and-sum array. At the same time, the position of the speaker is detected with a camera 114.

More specifically, an image of the speaker is captured by the camera 114, and an output from the camera 114 is transmitted to a speaker position detector 115. The speaker position detector 115 processes an output image from the camera 114 so as to detect the position of the face of the speaker. The position of the face of the speaker is detected, for example, by a known method such as color indexing (e.g., disclosed in "Color Indexing" in International Journal of Computer Vision, 7:1, pp.11–32 (1991), Kluwer Academic Publishers). When the position of the face of the speaker is detected, the information about the detected position is transmitted to a delay calculator 116.

The delay calculator 116 calculates the number of delay samples of the delay units 105 based on the information about the position of the face of the speaker so as to control the delay units 105.

As described above, the use of the microphone array of this embodiment makes it possible to detect the position of the source of the desired signal precisely and enhance the source of a desired signal even in an environment with a high noise level.

In the description of the embodiments of the present invention, it is possible to use non-directional or directional microphones as the real microphones, unless otherwise specified. It is advantageous to use non-directional microphones because of their lower production costs. On the other hand, directional microphones may provide higher processing efficiency in the case where people are present in a limited range.

As described above, the present invention can realize a compact microphone array with a small number of real microphones that has the same characteristics as a microphone array including a large number of real microphones.

Furthermore, the microphone array of the present invention makes it possible to separate sound signals appropriately from two sources of desired signals in a certain environment. Therefore, it is possible to identify the speech of a driver instructing operations in a high noise level precisely when the present invention is applied to car electronic devices provided with functions operated by speech recognition.

Furthermore, the microphone array of the present invention provides an effect of more precisely estimating the direction or the position of the sound source.

Furthermore, the microphone array of the present invention provides an effect of appropriately enhancing the desired signal in an environment with a high noise level.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A microphone array including a plurality of real microphones and at least one virtual microphone comprising:

a sound signal divider for dividing sound signals coming to the array from an arbitrary number of sound sources in arbitrary directions and received by the plurality of real microphones, the sound signal divider dividing a sound signal received by a predetermined one of the real microphones into components, by using wave equations, each component corresponding to one coordinate axis direction in a coordinate system defined on the basis of positions of the plurality of real microphones;

wherein the wave equations are the following equations:

$$v(x_0, t_j)=v(x_0, t_{j-1})+(1/b)\cdot\{p(x_1, t_{j-1})-p(x_0, t_{j-1})\}$$

$$v(x_1, t_j)=v(x_1, t_{j-1})+(1/b)\cdot\{p(x_2, t_{j-1})-p(x_1, t_{j-1})\}$$

$$px(x_1, t_j)=px(x_1, t_{j-1})+(1/a)\cdot\{v(x_1, t_j)-v(x_0, t_j)\}$$

$$py(x_1, t_j)=p(x_1, t_j)-px(x_1, t_j)$$

where, t represents time, p represents the sound pressure, v represents the velocity of air particles, which are the medium for propagation of the sound wave, a represents a constant coefficient, and b represents a constant coefficient;

a sound signal component estimator for estimating a virtual microphone sound signal component corresponding to a coordinate axis direction in the coordinate system;

a sound power calculator for calculating sound powers of components, each component corresponding to one coordinate axis direction, of a sound signal received by the real microphone and a virtual microphone sound signal, based on the sound signal component divided by the sound signal divider and the sound signal component estimated by the sound signal component estimator; and a sound source position estimator for estimating a position of a sound source based on the sound powers calculated by the sound power calculator.

* * * * *